US012579592B2

(12) United States Patent
Karmakar et al.

(10) Patent No.: US 12,579,592 B2
(45) Date of Patent: Mar. 17, 2026

(54) AUTOMATED TOOL FOR GENERATING AND PROVIDING HOUSING-RELATED INFORMATION

(71) Applicant: MFTB Holdco, Inc., Seattle, WA (US)

(72) Inventors: Aveek Karmakar, Issaquah, WA (US);
Giuliano Janson, Lynnwood, WA (US);
Min Hung Shih, Redmond, WA (US);
Tanner McGlenn Newton, Watsonville,
CA (US); David Bell Waterson, San
Francisco, CA (US); **Anusha Satish
Bagalkotkar**, Kenmore, WA (US)

(73) Assignee: MFTB Holdco, Inc., Seattle, WA (US)

( * ) Notice: Subject to any disclaimer, the term of this patent is extended or adjusted under 35 U.S.C. 154(b) by 18 days.

(21) Appl. No.: 18/628,765

(22) Filed: Apr. 7, 2024

(65) Prior Publication Data
US 2026/0010963 A1     Jan. 8, 2026

Related U.S. Application Data

(60) Provisional application No. 63/611,196, filed on Dec. 17, 2023.

(51) Int. Cl.
*G06Q 50/16* (2024.01)
*G06F 40/20* (2020.01)
(Continued)

(52) U.S. Cl.
CPC ............. *G06Q 50/16* (2013.01); *G06F 40/20*
(2020.01); *G06Q 40/03* (2023.01); *H04L
51/02* (2013.01)

(58) Field of Classification Search
CPC ........ G06Q 50/16; G06Q 40/03; G06F 40/20;
H04L 51/02
See application file for complete search history.

(56) References Cited

U.S. PATENT DOCUMENTS 9,208,247 B2 * 12/2015 Gardner .................. H04L 67/12
2019/0332253 A1 * 10/2019 Wezorek .............. G06F 3/0483
2020/0357382 A1 * 11/2020 Ogawa ..................... G06N 3/02

OTHER PUBLICATIONS

Areti Karamanou, Linked Open Government Data to Predict and
Explain House Prices: The Case of Scottish Statistics Portal, 2022
(Year: 2022).*

(Continued)

*Primary Examiner* — Ibrahim N El-Bathy
(74) *Attorney, Agent, or Firm* — VLP Law Group LLP;
James A. D. White

(57) ABSTRACT
Techniques are described for performing automated operations related to generating and providing housing-related information, such as to automatically respond to free-form natural language query requests for housing-related information of various types received by a chatbot by using a combination of automated tools to generate and provide responsive housing-related information. In at least some situations, the described techniques generates responses using a trained large language model that maintains context over an interaction session with a user involving multiple user queries and corresponding responses, and ensuring accurate response information by restricting the generation of the response information in particular ways and by identifying and providing citations to authoritative sources used to generate the response information.

25 Claims, 14 Drawing Sheets

(51) Int. Cl.
  *G06Q 40/03*      (2023.01)
  *H04L 51/02*      (2022.01)

(56)                References Cited

OTHER PUBLICATIONS

"Zillow's new AI-powered natural-language search is a first in real estate", Jan. 26, 2023, retrieved on Nov. 22, 2023 from https://investors.zillowgroup.com/investors/news-and-events/news/news-details/2023/Zillows-new-AI-powered-natural-language-search-is-a-first-in-real-estate/default. aspx, 2 pages.

"Zillow builds ChatGPT plugin for real estate searches", May 2, 2023, retrieved on Dec. 18, 2023 from https://investors.zillowgroup.com/investors/news-and-events/news/news-details/2023/Zillow-builds-ChatGPT-plugin-for-real-estate-searches/default.aspx, 2 pages.

Homesnapblog, "New: Draw Your Own Search Area to Look for Homes", May 24, 2018, retrieved on Nov. 22, 2023 from https://blog.homesnap.com/homesnap-draw-your-own-search-area-homes/, 8 pages.

"Zillow home-search tools that can help you search multiple locations—or draw your own search map", Feb. 26, 2013, retrieved on Nov. 22, 2023 from https://www.zillowgroup.com/news/new-draw-your-own-search-on-zillow-com/, 4 pages.

Brian Carmody, "The 7 Best Real Estate Websites of 2024", Dec. 13, 2023, retrieved on Jan. 5, 2024 from https://www.investopedia.com/best-real-estate-websites-5069964, 19 pages.

Google Search Page for "homes near north lake" search, retrieved on Jan. 13, 2024 from https://www.google.com/search?q=homes+near+north+lake, 1 page.

Redfin Search Page for "north lake" search, retrieved on Jan. 13, 2024 from https://redfin.com, 1 page.

Redfin Search Page for "homes near north lake" search, retrieved on Jan. 13, 2024 from https://redfin.com, 1 page.

Redfin Search Page for "lake sammammish wa" search, retrieved on Jan. 13, 2024 from https://redfin.com, 1 page.

Redfin Search Page for "washington elementary school" search, retrieved on Jan. 13, 2024 from https://redfin.com, 1 page.

Matt G. Southern, "Google Maps Makes It Easier to Find Restaurants and Bars", Jun. 27, 2018, retrieved on Jan. 5, 2024 from https://www.searchenginejournal.com/google-maps-makes-it-easier-to-find-restaurants-and-bars/258949/, 3 pages.

"How Google Uses Location Information—Privacy & Terms", retrieved on Jan. 13, 2024 from https://policies.google.com/technologies/location-data, 13 pages.

Erwin van Holten, "How to Find Restaurants Other Than My Location", Mar. 6, 2023, retrieved on Jan. 5, 2024 from https://support.google.com/maps/thread/204943052/how-to-find-restaurants-other-than-my-location?hl=en, 5 pages.

"Searching for Homes—Redfin Customer Service", retrieved on Jan. 11, 2024 from https://support.redfin.com/hc/en-us/articles/360001432632-Searching-for-Homes, 11 pages.

Sarah Lentz, "Zillow and Redfin Announce ChatGPT Plugins to Change the Way People Search for Homes", May 4, 2023, retrieved on Jan. 13, 2024 from https://nowbam.com/zillow-and-redfin-announce-chatgpt-plugins-to-change-the-way-people-search-for-homes/, 5 pages.

Cem Dilmegani, "Mortgage Chatbots in 2023: Top Use Cases & Examples", Sep. 7, 2023, etrieved on Nov. 27, 2023 from https://research.aimultiple.com/mortgage-chatbot/, 13 pages.

Kim Martineau, "What Is Retrieval-Augmented Generation", retrieved on Nov. 29, 2023 from https://research.ibm.com/blog/retrieval-augmented-generation-RAG, 5 pages.

"LLMs That Reason and Act", retrieved on Nov. 29, 2023 from https://learnprompting.org/docs/advanced_applications/react, 4 pages.

Bryan McKenney, "Teaching LLMs to Think and Act: ReAct Prompt Engineering", Jun. 9, 2023, retrieved on Nov. 29, 2023 from https://medium.com/@bryan.mckenney/teaching-llms-to-think-and-act-react-prompt-engineering-eef278555a2e, 15 pages.

Rick Merritt, "What Is Retrieval-Augmented Generation aka RAG", retrieved on Nov. 29, 2023 from https://blogs.nvidia.com/blog/what-is-retrieval-augmented-generation/, 5 pages.

Zachary Proser, "Retrieval-Augmented Generation (RAG): The Solution to GenAI Hallucinations", retrieved on Nov. 29, 2023 from https://www.pinecone.io/learn/retrieval-augmented-generation/, 12 pages.

"Rocket Mortgage: Talk to Us", retrieved on Nov. 27, 2023 from https://www.rocketmortgage.com/talk-to-us, 5 pages.

"Zillow Builds ChatGPT Plugin for Real Estate Searches", May 2, 2023, retrieved on Nov. 27, 2023 from https://zillow.mediaroom.com/2023-05-02-Zillow-builds-ChatGPT-plugin-for-real-estate-searches, 4 pages.

Taylor Soper, "Zillow Group Rolls Out ChatGPT Tool, Sees Conversational AI as a Growth Opportunity", May 3, 2023, retrieved on Nov. 27, 2023 from https://www.geekwire.com/2023/zillow-group-rolls-out-chatgpt-tool-sees-conversational-ai-as-a-growth-opportunity/, 2 pages.

"Zillow Home Loans", retrieved on Nov. 27, 2023 from https://www.zillowhomeloans.com, 6 pages.

Spencer Lee, "Zillow, Redfin Introduce ChatGPT Plugins", May 5, 2023, retrieved on Nov. 27, 2023 from https://www.nationalmortgagenews.com/news/zillow-redfin-introduce-chatgpt-plugins, 4 pages.

Ben Verde, "Zillow Unveils Affordability Tool That Prioritizes Buyers' Monthly Budget", Apr. 10, 2023, retrieved on Nov. 27, 2023 from https://www.inman.com/2023/04/10/zillow-unveils-affordability-tool-that-prioritizes-buyers-monthly-budget/, 5 pages.

* cited by examiner

*Fig. 1B*

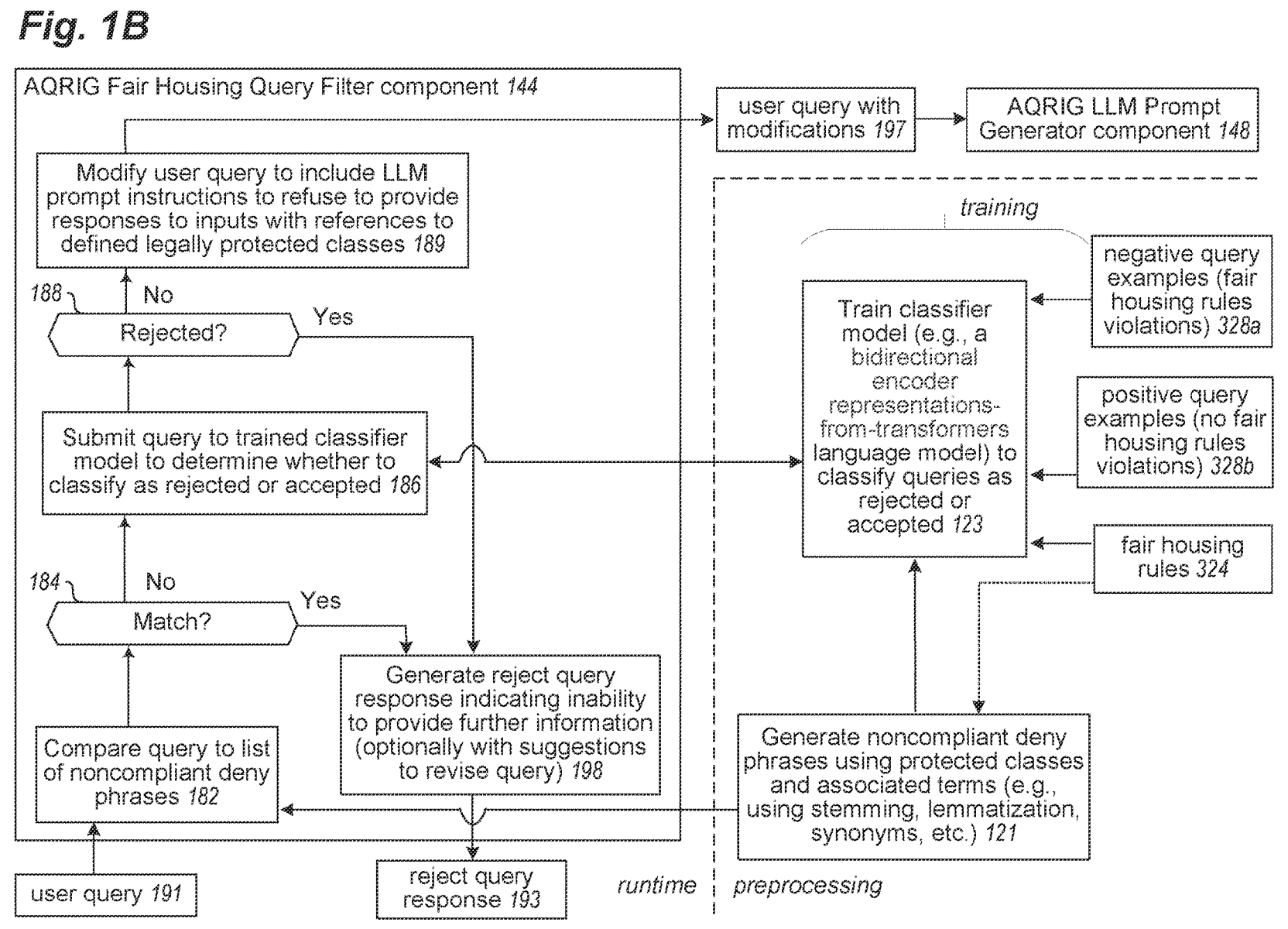

AQRIG LLM Prompt Generator component 148 negative query examples (fair housing rules violations) 328a positive query examples (no fair housing rules violations) 328b fair housing rules 324 user query with modifications 197

*training*

Train classifier model (e.g., a bidirectional encoder representations-from-transformers language model) to classify queries as rejected or accepted 123

Generate noncompliant deny phrases using protected classes and associated terms (e.g., using stemming, lemmatization, synonyms, etc.) 121

*preprocessing*

*runtime*

AQRIG Fair Housing Query Filter component 144

Modify user query to include LLM prompt instructions to refuse to provide responses to inputs with references to defined legally protected classes 189

188    No    Rejected?    Yes

Submit query to trained classifier model to determine whether to classify as rejected or accepted 186

Generate reject query response indicating inability to provide further information (optionally with suggestions to revise query) 198 reject query response 193

184    No    Match?    Yes

Compare query to list of noncompliant deny phrases 182 user query 191

*Fig. 2A*     <u>Example Chatbot GUI And Interactions</u>

The AQRIG system can provide a variety of types of housing-related information, including information about what you can afford (with no impact to your credit score).

Get started with our conversational chatbot

What to do next

See buildings in a region of interest using traditional keywords and filters   >

Get pre-qualified for a home loan   >

About the AQRIG system   >

Figure 2B:
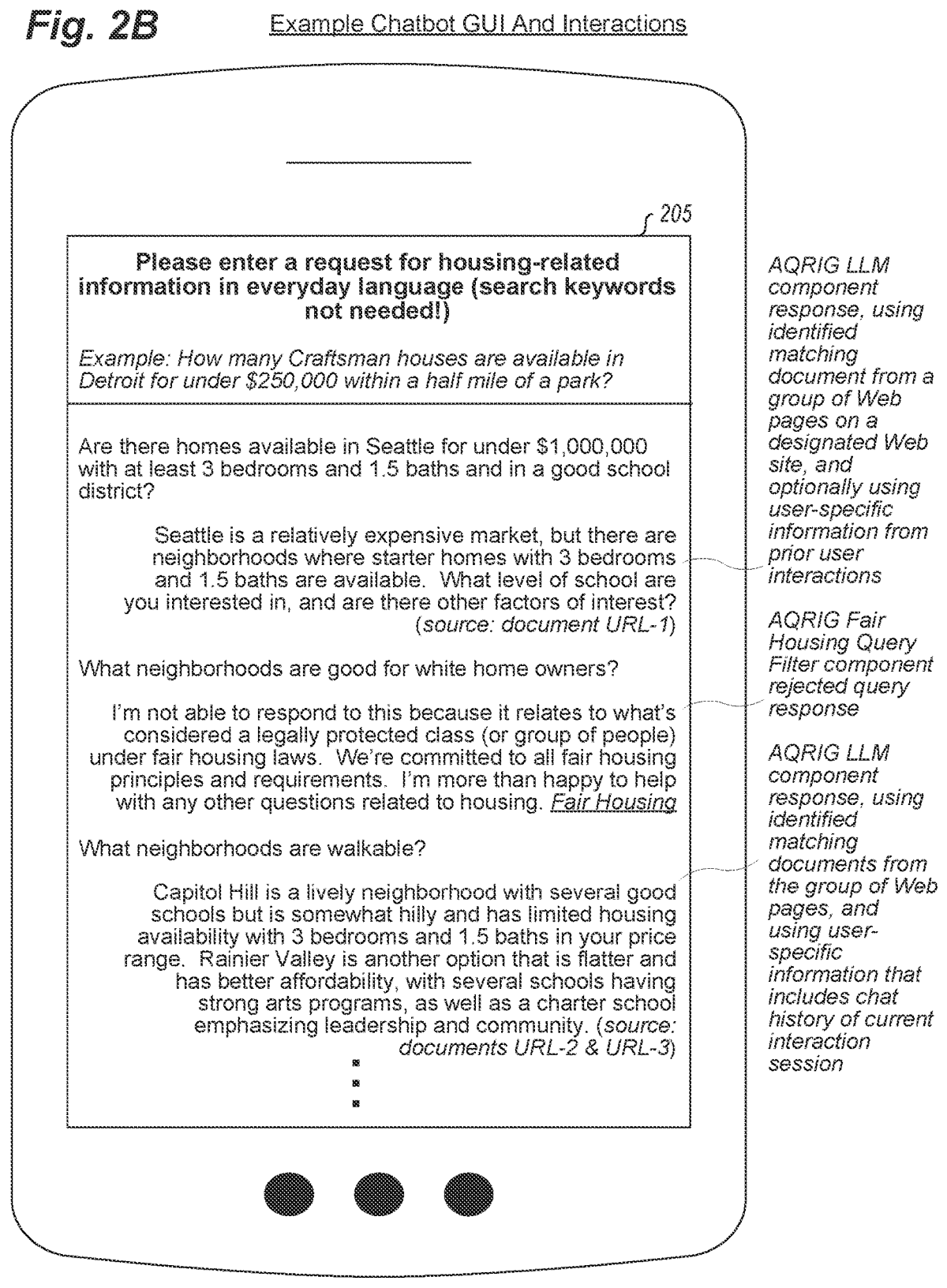

*Fig. 2B*     Example Chatbot GUI And Interactions

205

Please enter a request for housing-related information in everyday language (search keywords not needed!)

*Example: How many Craftsman houses are available in Detroit for under $250,000 within a half mile of a park?*

Are there homes available in Seattle for under $1,000,000 with at least 3 bedrooms and 1.5 baths and in a good school district?

> Seattle is a relatively expensive market, but there are neighborhoods where starter homes with 3 bedrooms and 1.5 baths are available. What level of school are you interested in, and are there other factors of interest?
> (*source: document URL-1*)

What neighborhoods are good for white home owners?

> I'm not able to respond to this because it relates to what's considered a legally protected class (or group of people) under fair housing laws. We're committed to all fair housing principles and requirements. I'm more than happy to help with any other questions related to housing. <u>Fair Housing</u>

What neighborhoods are walkable?

> Capitol Hill is a lively neighborhood with several good schools but is somewhat hilly and has limited housing availability with 3 bedrooms and 1.5 baths in your price range. Rainier Valley is another option that is flatter and has better affordability, with several schools having strong arts programs, as well as a charter school emphasizing leadership and community. (*source: documents URL-2 & URL-3*)

*AQRIG LLM component response, using identified matching document from a group of Web pages on a designated Web site, and optionally using user-specific information from prior user interactions*

*AQRIG Fair Housing Query Filter component rejected query response*

*AQRIG LLM component response, using identified matching documents from the group of Web pages, and using user-specific information that includes chat history of current interaction session*

*Fig. 2C*     <u>Example Chatbot GUI And Interactions</u>

Please enter a request for housing-related information in everyday language (search keywords not needed!)

⌗
⋮
⌗
⌗

Capitol Hill is a lively neighborhood with several good schools but is somewhat hilly and has limited housing availability with 3 bedrooms and 1.5 baths in your price range. Rainier Valley is another option that is flatter and has better affordability, with several schools having strong arts programs, as well as a charter school emphasizing leadership and community. (*source: documents URL-2 & URL-3*)

Can I afford a $1,000,000 house with a $150K salary, a 20% down payment, and $1000 other monthly expenses?

Using those parameters, a budget up to $620,000 should comfortably work. Any other sources of income or assets to increase that budget? If not, how about information for some areas around Seattle where that budget would provide options with 3 bedrooms and 1.5 baths in good school districts? The Auburn and North Bend areas, in which you've previously done some searches, are among the possible options. (*source: AQRIQ affordability calculator tool* )

How about if I wait until mortgage rates drop a couple of percentage points?

The current mortgage rates for a 30-year fixed rate conforming loan in Seattle are 7.07% (as of 35 minutes ago) — at 5.07% interest, the affordable budget increases to around $705,000. (*source: AQRIQ mortgage rate tool* )

⌗
⋮
⌗
⌗

*AQRIG LLM component response using AQRIQ affordability calculator tool and user-specific information that includes chat history of current interaction session and information about prior user searches in a different interaction session*

*AQRIG LLM component response using AQRIQ mortgage rate tool and user-specific information that includes chat history of current interaction session*

*Fig. 2D*     <u>Example Chatbot GUI And Interactions</u>

Please enter a request for housing-related information in everyday language (search keywords not needed!)

⠿
⠿
⠿

The current mortgage rates for a 30-year fixed rate conforming loan in Seattle are 7.07% (as of 35 minutes ago) – at 5.07% interest, the affordable budget increases to around $705,000. (*source: AQRIQ mortgage rate tool* )

*AQRIG LLM component response using AQRIQ regional statistical information tool and user-specific information (e.g., chat history of current interaction session)*

Tell me about recent sales information for Auburn

The median house price in Auburn over the last month was $591,785, with 15 houses currently available that meet your previous criteria and the $620,000 budget, and with 5 of those houses being newly pending over the last X days. The houses in Auburn are pending for 42 days on average (using median days). (*source: AQRIQ regional statistical information tool* )

*AQRIG LLM component response using current housing information tool and user-specific information (e.g., chat history of current interaction session)*

That sounds promising. Tell me more about those houses that also have at least a 2-car attached garage.

<list of 4 matching houses with 3+ bedrooms, 1.5+ baths, good school district, priced under $620,000, and at least a 2-car attached garage> (*source: MLS data*)

*AQRIG LLM component response using inspection-specific FAQ document contents and user-specific information (e.g., chat history of current interaction session)*

What should I know about getting home inspections?

<information about factors to consider in getting home inspections, including using information about the age of the Auburn houses and the median number of days pending for houses in Auburn> (*source: FAQ document URL-4*)

⠿
⠿
⠿

Figure 2E:
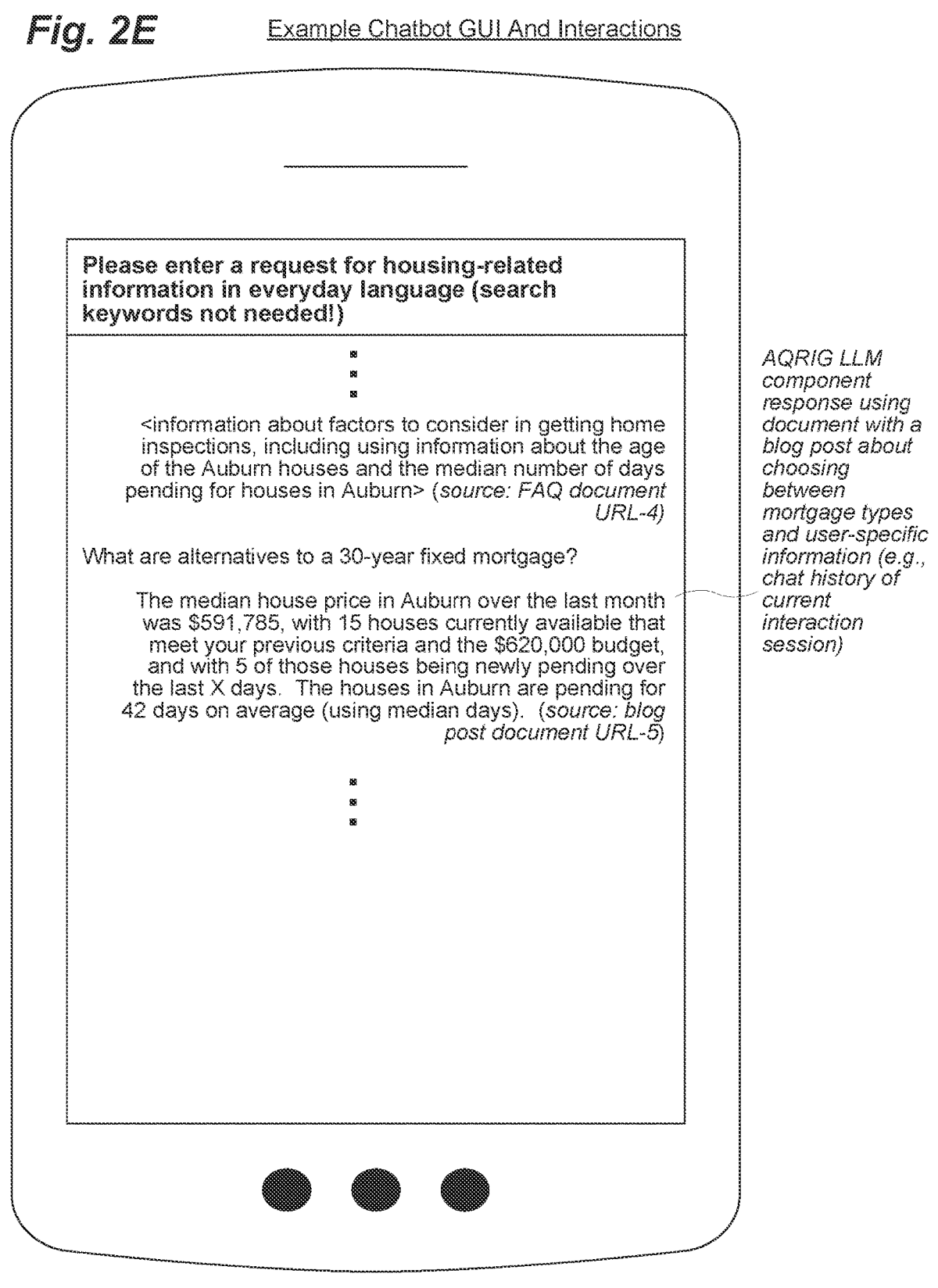

*Fig. 2E*     Example Chatbot GUI And Interactions

Please enter a request for housing-related information in everyday language (search keywords not needed!)

▪
▪
▪

<information about factors to consider in getting home inspections, including using information about the age of the Auburn houses and the median number of days pending for houses in Auburn> *(source: FAQ document URL-4)*

What are alternatives to a 30-year fixed mortgage?

The median house price in Auburn over the last month was $591,785, with 15 houses currently available that meet your previous criteria and the $620,000 budget, and with 5 of those houses being newly pending over the last X days. The houses in Auburn are pending for 42 days on average (using median days). *(source: blog post document URL-5)*

▪
▪
▪

*AQRIG LLM component response using document with a blog post about choosing between mortgage types and user-specific information (e.g., chat history of current interaction session)*

*Fig. 4B*

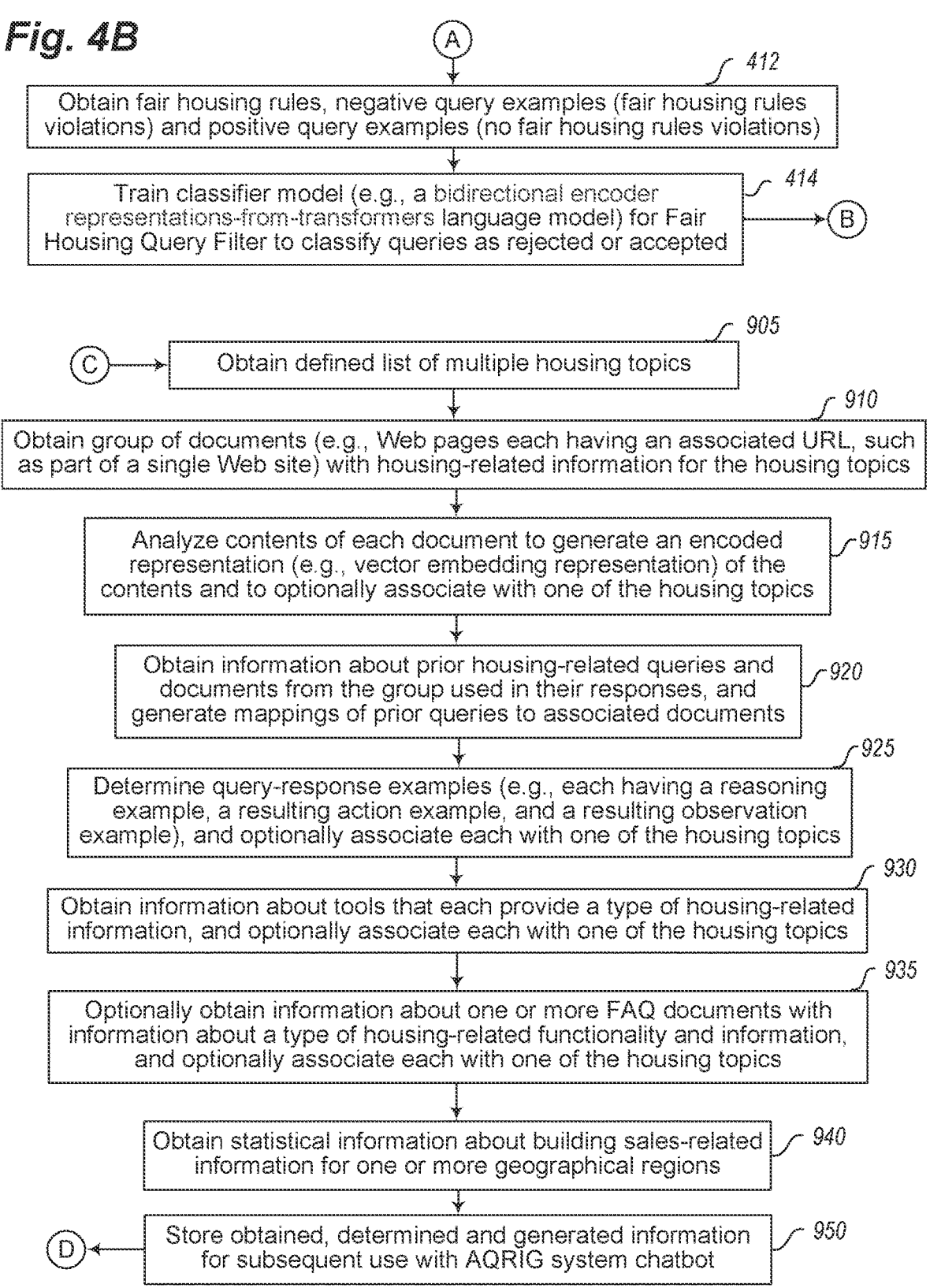

Ⓐ

*412*

Obtain fair housing rules, negative query examples (fair housing rules violations) and positive query examples (no fair housing rules violations)

*414*

Train classifier model (e.g., a bidirectional encoder representations-from-transformers language model) for Fair Housing Query Filter to classify queries as rejected or accepted → Ⓑ

Ⓒ → *905*

Obtain defined list of multiple housing topics

*910*

Obtain group of documents (e.g., Web pages each having an associated URL, such as part of a single Web site) with housing-related information for the housing topics

*915*

Analyze contents of each document to generate an encoded representation (e.g., vector embedding representation) of the contents and to optionally associate with one of the housing topics

*920*

Obtain information about prior housing-related queries and documents from the group used in their responses, and generate mappings of prior queries to associated documents

*925*

Determine query-response examples (e.g., each having a reasoning example, a resulting action example, and a resulting observation example), and optionally associate each with one of the housing topics

*930*

Obtain information about tools that each provide a type of housing-related information, and optionally associate each with one of the housing topics

*935*

Optionally obtain information about one or more FAQ documents with information about a type of housing-related functionality and information, and optionally associate each with one of the housing topics

*940*

Obtain statistical information about building sales-related information for one or more geographical regions

*950*

Ⓓ ← Store obtained, determined and generated information for subsequent use with AQRIG system chatbot

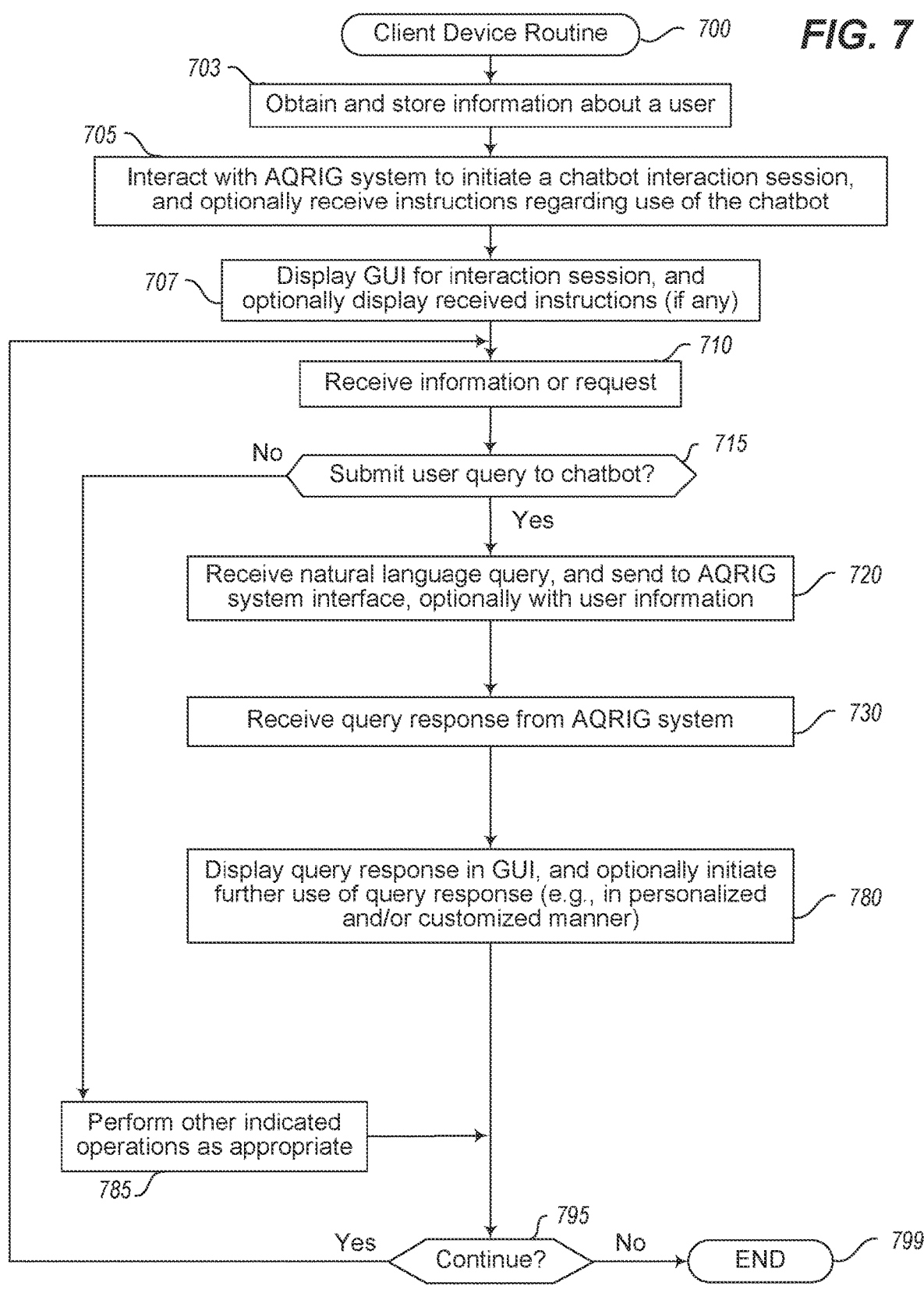

FIG. 7

Client Device Routine — 700

703 — Obtain and store information about a user

705 — Interact with AQRIG system to initiate a chatbot interaction session, and optionally receive instructions regarding use of the chatbot 707 — Display GUI for interaction session, and optionally display received instructions (if any)

710 — Receive information or request

715 — Submit user query to chatbot?    No    Yes

720 — Receive natural language query, and send to AQRIG system interface, optionally with user information 730 — Receive query response from AQRIG system 780 — Display query response in GUI, and optionally initiate further use of query response (e.g., in personalized and/or customized manner)

785 — Perform other indicated operations as appropriate

795 — Continue?    Yes    No

799 — END

AUTOMATED TOOL FOR GENERATING AND PROVIDING HOUSING-RELATED INFORMATION

CROSS REFERENCE TO RELATED APPLICATIONS

This application claims the benefit of U.S. Provisional Patent Application No. 63/611,196, filed Dec. 17, 2023 and entitled "Automated Tool For Generating And Providing Housing-Related Information," which is hereby incorporated by reference in its entirety.

TECHNICAL FIELD

The following disclosure relates generally to techniques for automatically generating and providing housing-related information, such as to automatically respond to free-form natural language requests for housing-related information of various types by using a chatbot having multiple automated tools to generate and provide responsive housing-related information.

BACKGROUND

An abundance of information is available to users on a wide variety of topics from a variety of sources. For example, portions of the World Wide Web ("the Web") are akin to an electronic library of documents and other data resources distributed over the Internet, with billions of documents available, including groups of documents directed to various specific topic areas. In addition, various other information is available via other communication mediums. However, existing search engines and other techniques for identifying information of interest suffer from various problems. Non-exclusive examples include a difficulty in understanding natural language requests, difficulty in providing accurate information that is specific to a particular topic of interest, difficulty in limiting information requests to approved topics, etc.

BRIEF DESCRIPTION OF THE DRAWINGS

FIGS. 1A-1C are network diagrams illustrating an example system for performing described techniques, including automatically responding to free-form natural language requests for housing-related information of various types by using a chatbot having multiple automated tools to generate and provide responsive housing-related information.

FIGS. 2A-2E illustrate examples of performing described techniques, including automatically responding to free-form natural language requests for housing-related information of various types by using a chatbot having multiple automated tools to generate and provide responsive housing-related information.

FIGS. 4A-4B illustrate a flow diagram of an example embodiment of an Automated Query-Response Information Generation ("AQRIG") system routine.

FIG. 7 illustrates a flow diagram of an example embodiment of a client device routine.

DETAILED DESCRIPTION

Figure 1A:
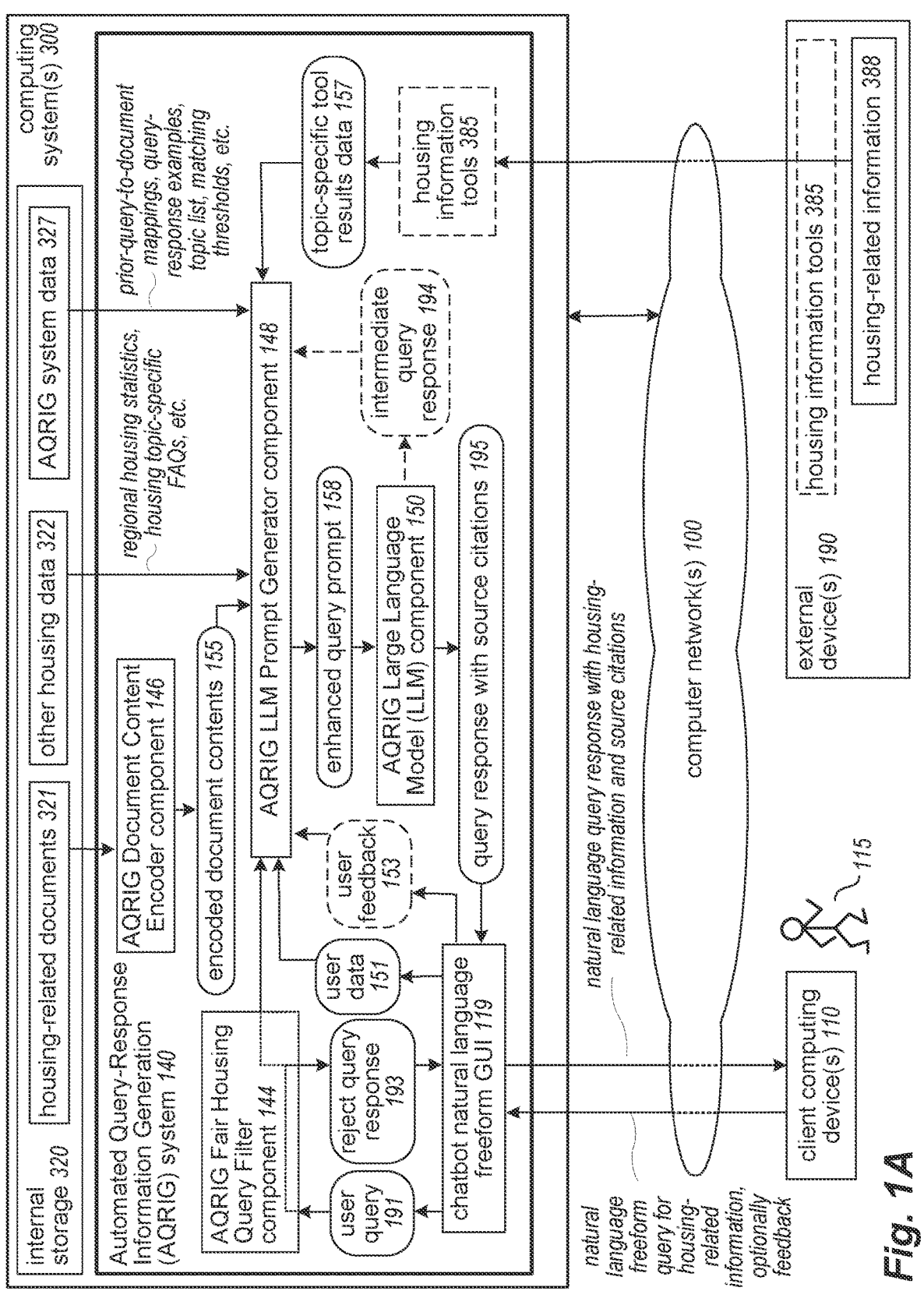

The present disclosure describes techniques for using computing devices to perform automated operations involving automatically generating and providing housing-related information, such as to automatically respond to free-form natural language query requests for housing-related information of various types by using a chatbot with multiple automated tools to generate and provide responsive housing-related information. In at least some embodiments, the described techniques include providing a chatbot that provides housing-related information in response to free-form natural language requests, including to generate responses using a trained large language model (LLM) that maintains context over an interaction session with a user having multiple user queries and corresponding responses, and ensuring accurate response information by restricting the response information generation in particular ways (e.g., based on construction of the LLM query prompts) and by identifying and providing citations to authoritative sources used to generate the response information. Furthermore, various additional techniques may be used in some embodiments to improve speed and/or accuracy of determined response information to received natural language queries, including performing automated processing of authoritative source documents to encode contents of the documents in a form that enhances subsequent identification and retrieval, such as by using vector-based embeddings that semantically encode contents in such a manner that two vector embeddings for two similar groups of content are themselves similar (e.g., as reflected by having a small distance between them using one or more distance metrics). Additional details are included below regarding the automated analysis and use of authoritative sources of housing-related information as part of automatically responding to free-form natural language query requests for housing-related information of various types by using a chatbot to generate and provide responsive housing-related information, and some or all of the techniques described herein may, in at least some embodiments, be performed via automated operations of an Automated Query-Response Information Generation ("AQRIG") system, as discussed further below.

In at least some embodiments, the ensuring of the accurate response information by restricting the response information generation includes one or more of the following: providing a query filter that is trained to reject user queries satisfying one or more reject criteria (e.g., a fair housing rule filter that rejects user queries associated with fair housing rule violations); using a defined group of authoritative source tools to each provide current housing-related information of a particular type used in responses (e.g., information about current housing statistics and/or individual available houses, information about current mortgage rates and/or other housing affordability factors, etc.); using a defined list of enumerated housing-related topics to categorize user queries and restrict corresponding response information by determining corresponding defined tools to use in generating the response information; using a defined group of authoritative source documents from which to provide housing-related information used in responses (e.g., a group of Web pages associated with a Web site having information about the enumerated housing-related topics); using particular authoritative source documents each associated with a particular housing-related topic from which to provide housing-related information used in responses (e.g., a FAQ page or other summary page with information about a topic such as obtaining and using inspections, obtaining house acquisition financing, etc.); using associations of prior queries to particular authoritative source documents used in generating their responses, such as to, when responding to a new user query that matches one or more of the prior queries (e.g., with a similarity above a defined threshold), use the associated source document(s) for the matching prior query (ies) as part of responding to the current user query; using examples of query-response pairs for LLM prompt generation (e.g., ReACT, or Reasoning and ACTing, reasoning-action-observation query-response pair examples that each include one or more series of a reasoning activity, followed by an acting activity that is based on the results of the reasoning activity, followed by an observation activity that is based on the results of the acting activity); etc. Additional details are included below related to the restricting of the response information generation.

Figure 1C:
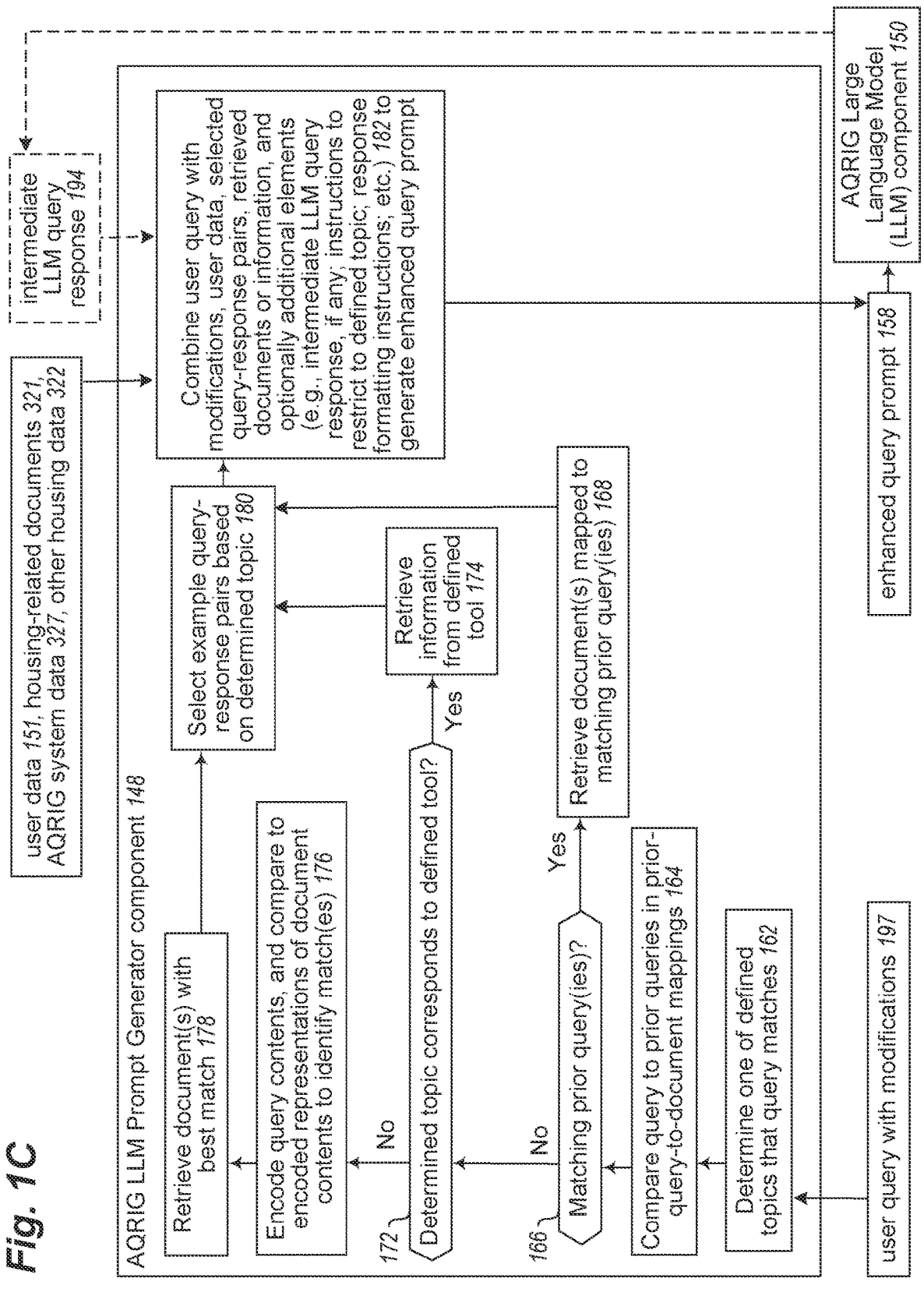

FIGS. 1A-1C are network diagrams illustrating an example system for performing described techniques, including automatically responding to free-form natural language requests for housing-related information of various types by using a chatbot having multiple automated tools to generate and provide responsive housing-related information.

In particular, FIG. 1A illustrates information about an example embodiment of an AQRIG system 140 executing on one or more computing systems 300, and interacting over one or more computer networks 100 with one or more client computing devices 110, such as to receive housing-related query requests from users 115 of the client computing devices and to provide corresponding responses with requested housing-related information. In the illustrated embodiment, the computing systems 300 may store various information on storage 320 that is used by the AQRIG system during operation, including a group of multiple housing-related documents 321, other housing data 322 (e.g., regional housing statistics, FAQ or other summary documents about specific housing topics, etc.), and AQRIG system data 327 (e.g., mappings of prior queries to documents of the group used in their responses, examples of query-response pairs to use as part of constructing query prompts for the AQRIG LLM component 150, a defined list of housing-related topics, similarity thresholds to determine when documents or other piece of content being compared are sufficiently similar to be determined to match, etc.). The AQRIG system may further use other housing-related information 388 stored externally to the computing systems 300, such as accessed over the one or more computer networks 100 from one or more external computing and/or storage devices 190, optionally by one or more of multiple defined housing information tools 385 executing on the computing systems 300 and/or on the external devices 190, such as to provide information from a tool that is specific to one of the housing topics with which the tool is associated.

As one example of operations of the AQRIG system 140, a particular user 115 of one of the client computing devices 110 may supply a housing-related query 191 to a natural language free-form input GUI of the chatbot provided by the AQRIG system. The GUI provides the user query to an AQRIG Fair Housing Query Filter component 144, which analyzes the user query to determine if it satisfies one or more specified reject criteria corresponding to potential or actual fair housing rule violations, and if so the component 144 generates a reject query response 193 that is returned to the user 115 via the chatbot GUI-FIG. 1B provides further details related to one example embodiment of such a component 144. If the component 144 does not find the user query to satisfy the one or more specified reject criteria, the component instead modifies the user query to include instructions to subsequently be provided to the AQRIG LLM component 150 to decline providing responses to inputs that correspond to legally protected classes, and forwards the modified user query to the AQRIG LLM Prompt Generator component 148. The component 148 performs a series of activities and uses a variety of types of information to generate an enhanced query prompt 158 to supply to the AQRIG LLM component 150 to cause component 150 to restrict its response to one or more of the defined list of housing-related topics, to use authoritative sources of information specified by the component 148, and to provide a citation of one or more of the authoritative sources used to generate the query response 195 as part of the query response-FIG. 1C provides further details related to one example embodiment of such a component 150. In some embodiments and situations, the component 148 may perform a series of multiple intermediate query-response interactions with the component 150 to generate a final query response 195, such as to cause the component 150 to generate a first intermediate query response 194 for a first enhanced query prompt 158 provided to the component 150, with the intermediate query response provided back to the component 148 and used to generate a second enhanced query prompt 158 that produces either the final query response 195 or instead a second intermediate query response 194 (with the process repeating until the final query response 195 is produced, and in some embodiments and situations being performed as part of using ReACT processing techniques).

As discussed further in FIG. 1C, as part of the operation of the component 148, it may determine whether the received user query 191 with modifications from component 144 matches any prior queries that have been mapped to documents used in their response, and if so include references to those documents as part of the enhanced query prompt to be used by the component 150 in its generation of a response. If there is not such a matching prior query, or in addition to the use of such mapped documents for one or more such matching prior queries, the component 148 may further analyze the received user query to determine one of multiple enumerated housing-related topics to which the query corresponds, and use that associated topic as part of determining and providing other information in the enhanced query prompt for the component 150. For example, the component 148 may determine whether the user query corresponds to encoded document contents 155 that are generated by the AQRIG Document Content Encoder component 146, which generates an encoded representation (e.g., a vector-based embedding) of the contents of each of a group of multiple housing-related documents 321—if one or more such encoded document contents are determined to match an encoded version of the user query (e.g., with the similarity above a defined matching threshold, such as a distance between two vector embeddings that is less than a defined threshold distance), the corresponding document may be provided as part of the enhanced query prompt generated by the component 148, such as part of using retrieval augmented generation techniques. Furthermore, whether instead of or in addition to using one or more such documents identified from the encoded document contents 155 as part of the enhanced query prompt, the component 148 may determine that the user query corresponds to a housing topic associated with one of multiple defined housing information tools 385, and if so may query and obtain current topic-specific tool results data 157 from a corresponding housing information tool, and include such retrieved topic-specific housing information as part of the generated enhanced query prompt-non-exclusive examples of such tool data may include regional housing statistics, current mortgage rates, information from a housing affordability calculator, etc. Similarly, whether instead of or in addition to using one or more such documents identified from the encoded document contents 155 and/or tool results data 157 as part of the enhanced query prompt, the component 148 may use the housing-related topic associated with the user query to identify one or more FAQs or other summary documents associated with that topic and include the identified summary document(s) as part of the generated enhanced query prompt 158. The component 148 may further use the associated topic for the user query to identify one or more query-response examples to include in the enhanced query prompt, including in some embodiments and situations to use ReACT (Reasoning and ACTing) query-response pair examples that each include one or more series of a reasoning activity, followed by an action activity that is based on the results of the reasoning activity, followed by an observation activity that is based on the results of the action activity.

After the final query response 195 with the source citations is generated by the component 150, or if the component 144 instead generated a reject query response 193 without forwarding the user query to the component 148, the generated query response 195 or 193 is provided by the GUI 119 to the client computing device of the user who submitted the query, such as for display on the client computing device as part of the chatbot GUI. The same user may provide a subsequent query 191 to the GUI 119 as part of an ongoing interaction session in which the context of the prior interactions during that session are maintained, with similar processing performed for the next user query.

In addition, the component 148 may use various user-specific data 151 as part of its generation of the enhanced query prompt, including information about prior queries and responses in a current interaction session with the user (e.g., the last 10 queries and/or responses, the last 100 queries and/or responses, all prior queries and/or responses, etc.) and/or other user-specific information available to the system 140 (e.g., based on prior user activities involving interacting with building information, based on demographic or other information specific to the user that the system 140 receives, etc.). In addition, the component 148 may further in some embodiments and situations receive optional user feedback 153 that is further used to modify the ongoing operations of the component 148, whether explicit feedback provided by the user via the GUI (e.g., an indication that a prior response was inaccurate and/or irrelevant to the user query), and/or implicit feedback based on an analysis of subsequent user queries (e.g., to indicate that a prior query response did not provide information that the user was seeking), such as to optionally be incorporated in subsequent generated enhanced query prompts for that interaction session. Furthermore, the AQRIG system 140 may in some embodiments and situations provide additional types of functionality separate from the chatbot (e.g., functionality to identify inspectors and/or schedule inspections for particular houses, functionality to identify real estate professionals and initiate corresponding follow-up interactions between them and the user, functionality to identify a mortgage provider and/or initiate a mortgage application process for the user, etc.), and may provide that additional functionality to a user upon a request of the user and/or based on corresponding query responses provided to the user in response to related user queries. While the example discussed above involves a single user performing multiple interactions with the AQRIG system as part of an interaction session (e.g., spanning seconds, minutes, hours, days, etc.), it will be appreciated that the AQRIG system may in at least some embodiments and situations be concurrently interacting with many users using different client computing devices concurrently, such as to maintain a separate interaction session history for each such user, and that a new interaction session with a user may be initiated after one or more prior interaction sessions with that user in various manners (e.g., based on a corresponding user instruction, such as to reflect a change in the types of housing-related information of interest; as determined automatically by the AQRIG system, such as to reflect a change in the types of housing-related information being requested, or due to a defined period of time since a last user interaction being exceeded, such as one or more days; etc.).

Figure 3:
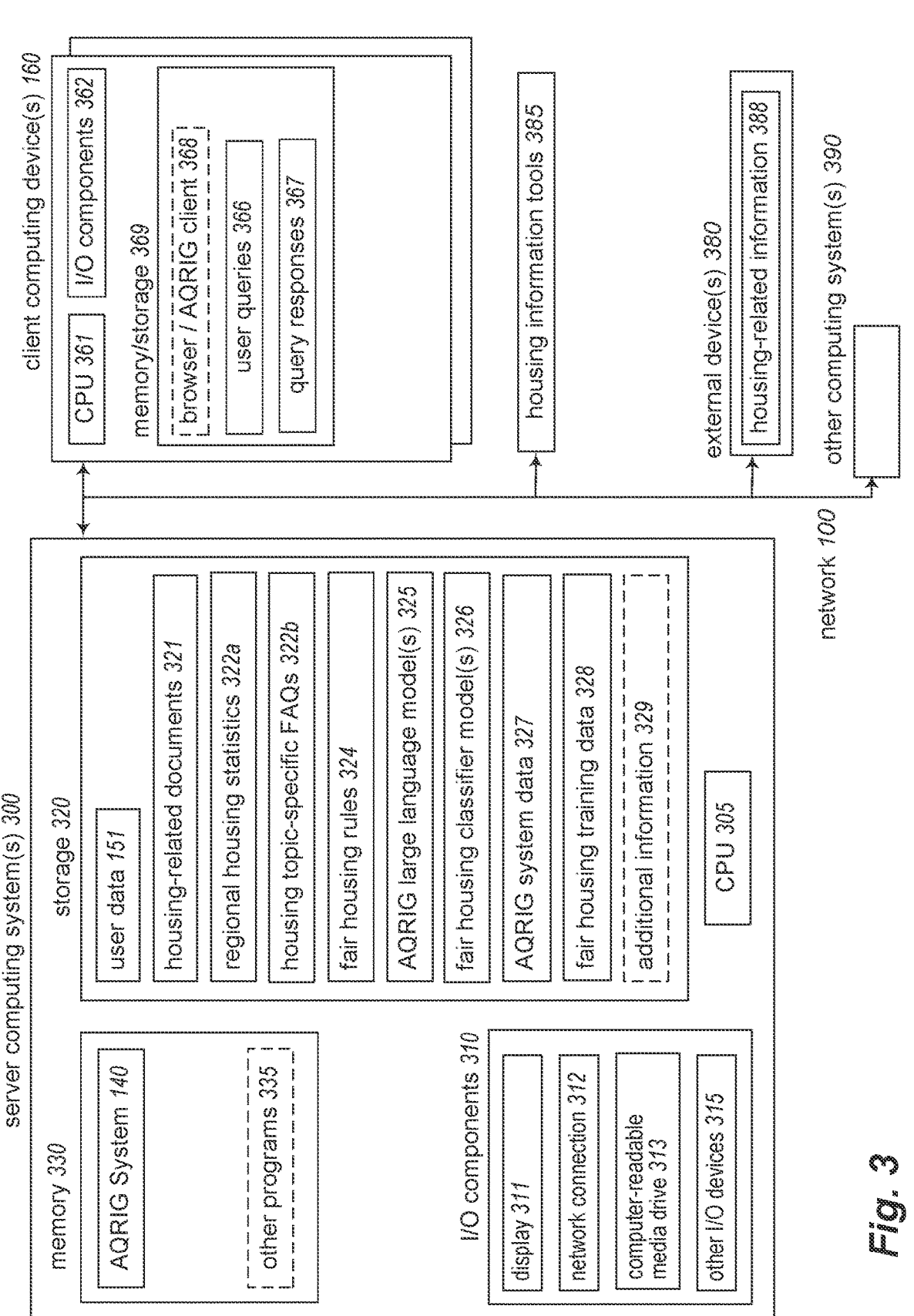
FIG. 3 is a block diagram illustrating an example of a computing system for use in performing described techniques, including automatically responding to free-form natural language requests for housing-related information of various types by using a chatbot having multiple automated tools to generate and provide responsive housing-related information.

In addition, the computing system(s) 300 may include various other components and functionality, as discussed in greater detail elsewhere herein, including with respect to FIG. 3. The computer networks 100 may similarly be of various types in various embodiments and may include various types of wired and/or wireless segments, including one or more publicly accessible linked networks (e.g., operated by various distinct parties, such as the Internet) and/or a private network (e.g., a corporate or university network that is wholly or partially inaccessible to non-privileged users), including in some cases to have both private and public networks (e.g., with one or more of the private networks having access to and/or from one or more of the public networks).

FIG. 1B continues the example of FIG. 1A, and illustrates one example embodiment of the AQRIG Fair Housing Query Filter component 144 discussed in FIG. 1A. In particular, in the illustrated embodiment, the component 144 performs various activities to determine whether a user query 191 satisfies one or more defined reject criteria, and if so generates a reject query response 193 that is provided back in response to the user query, while otherwise forwarding the user query along for further processing, optionally along with modifications of one or more types. In the illustrated example, the component 144 includes a trained classifier model (e.g., a bidirectional encoder representations-from-transformers, or BERT, language model), which is trained before its subsequent use by the component 144 using training data that in this example includes negative query examples corresponding to fair housing rules violations 328a, positive query examples that correspond to no fair housing rules violations 328b, a list of noncompliant deny phrases each having one or more words or other terms 121, and actual fair housing rules 324. The classifier model is trained 123 to classify a new user query as rejected (based on violating one or more reject criteria) or accepted. In addition to the training of the classifier model, preprocessing activities may include generating 121 the list of noncompliant deny phrases, such as using fair housing rules 324 to determine legally protected classes (e.g., race, gender, marital status, age, etc.), as well as using techniques such as stemming, lemmatization, synonyms, etc. to identify extensions and alternatives to an initial list of deny phrases. In some embodiments and situations, the training of the classifier model and/or the generation of the noncompliant deny phrases may occur only once, while in other embodiments and situations the training of the classifier model and/or the generation of the noncompliant deny phrases may occur multiple times (e.g., periodically, substantially continuously, etc.), including to optionally use user feedback 153 and/or other feedback for those activities.

In operation, the component 144 receives the user query 191 and compares it 182 to the list of noncompliant deny phrases. If it is determined in step 184 that there is a match (e.g., with a similarity above a defined threshold), the routine continues to block 198 to generate a reject query response 193 indicating an inability to provide further information for the query, optionally with suggestions on how to revise the query. Otherwise, the routine continues to block 186 to submit 186 the query to the trained classifier model to determine whether to classify the user query as rejected or accepted. If it is determined in block 188 that the classifier model has classified it as rejected, the routine continues to block 198, and otherwise continues to modify 189 the user query to include LLM prompt instructions that indicate to refuse to provide responses to inputs with references to defined legally protected classes, and to then forward the user query with the modifications 197 to the component 148 for further processing. While not illustrated here, in some embodiments and situations, rather than generating a reject query response, the component 144 may further modify a rejected user query to remove terms that cause it to be rejected (e.g., terms on the noncompliant deny phrase list) and forward that further modified user query for further processing.

FIG. 1C continues the examples of FIGS. 1A-1B, and illustrates one example embodiment of the AQRIG LLM Prompt Generator component 148 discussed in FIG. 1A. In particular, in the illustrated embodiment, the component 148 performs various activities to generate an enhanced query prompt 158 to provide to the AQRIG LLM component 150. In operation, the component 148 receives a user query with modifications 197 from the AQRIG Fair Housing Filter component 144, and determines 162 one of multiple defined housing-related topics to which the query corresponds. In block 164, the component then compares the user query to prior queries that are mapped to documents used in prior responses to those prior queries. If it is determined in block 166 that there are one or more matching prior queries (e.g., with a similarity above a defined threshold), the routine continues to block 168 to retrieve the one or more documents mapped to those matching one or more prior queries, and otherwise continues to block 172 to check if the determined topic for the user query corresponds to one of multiple defined tools. If so, the routine continues to block 174 to retrieve information from the defined tool about that housing-related topic, and otherwise continues to block 176 to determine one or more of a defined group of documents whose contents match the query contents (e.g., with a similarity above a defined threshold), with those one or more best matching documents retrieved in block 178—in particular, in this example, the routine in block 176 encodes the contents of the query (e.g., generates a vector embedding representation of the query contents) and uses a distance metric to determine that the similarity of the encoded query contents to one or more of the encoded representations of the retrieved documents is above a defined threshold (e.g., below a defined distance) or otherwise provides a best match. After blocks 168, 174, or 178, the routine in block 180 selects one or more example query-response pairs (e.g., as matching the user query, based on the determined topic for the query, etc.). In block 182, the routine then combines the user query with the modifications 197, user data 151, selected query-response pairs, retrieved documents or information from blocks 168 or 174 or 178, and optionally one or more additional elements to generate enhanced query prompt 158—such optional additional elements may include, for example, information from an intermediate LLM query response (if any), instructions to restrict the response to the defined topic, response formatting instructions, etc. After the enhanced query prompt 158 is generated, it is provided to the AQRIG LLM component 150.

It will be appreciated that various details are provided with respect to FIGS. 1A-1C for illustrative purposes, and are not intended to limit the scope of the invention unless otherwise indicated. Similarly, additional exemplary details are provided with respect to FIGS. 2A-2E and elsewhere herein, and such details are similarly provided for illustrative purposes and are not intended to limit the scope of the invention unless otherwise indicated.

FIGS. 2A-2E illustrate examples of performing described techniques, including automatically responding to free-form natural language requests for housing-related information of various types by using a chatbot having multiple automated tools to generate and provide responsive housing-related information.

In particular, FIG. 2A illustrates an example client computing device 200 (in this example, a smartphone) that is being used by a user (not shown) to interact with a chatbot provided by the AQRIG system, with corresponding information shown in a GUI 205 of the chatbot. In this example, the initial information is a greeting screen that includes a user selectable control 210 to initiate interactions with the chatbot, as well as other options 215 of other functionality that may be selected by the user.

FIG. 2B continues the example of FIG. 2A, and corresponds to selection of control 210 in FIG. 2A, with the GUI 205 updated to show instructions for using the chatbot at the top, and a series of user queries and corresponding AQRIG chatbot responses. In this example, the user begins by asking about homes available in Seattle for under $1 million with at least 3 bedrooms and 1.5 baths and being in a good school district. The chatbot provides a response with information at a high level about possible options in Seattle, as well as a request for further information, and includes a citation of a particular document with a corresponding URL that is used as a source for the information included. In the next user query, the user does not respond to the questions, and instead asked further information about particular types of neighborhoods, but in a manner that is determined by the AQRIG system to be a fair housing violation, with a corresponding reject query response provided that optionally includes instructions to improve or change the query (with particular language of the reject query response not shown in this example). The user then submits a third query related to walkable neighborhoods, and the AQRIG system responds with information about particular neighborhoods that are walkable, using context from the user's prior request about types of homes of interest to provide further data related to those factors, indicating two documents that are used as a source for the response with corresponding URLs shown.

FIG. 2C continues the examples of FIGS. 2A-2B, and in particular continues the interaction session with the same user, with the last AQRIG system response shown at the top followed by an additional user query related to affordability for housing. In this example, the AQRIG system uses information from a selected defined tool (e.g., an affordability calculator tool) to generate a response, including citing the tool as the source for the information, as well as using information from prior interactions during the interaction session to tailor response to the user and his/her expressed interests. The user then submits a further query about the effect of mortgage rates on affordability, with the AQRIG system using another tool (e.g., a mortgage rate tool) to provide a corresponding response, citing the mortgage rate tool as a source for the response information.

FIG. 2D continues the examples of FIGS. 2A-2C, and in particular continues the interaction session with the same user, with the last AQRIG system response shown at the top, followed by an additional user query shown related to housing sales information about a particular indicated suburb of Seattle. The AQRIG system responds with information from a regional statistical information tool about recent housing sales activities in the indicated region, with that tool indicated as a source for the response information. The user next asks for more details about particular houses referenced in the prior response along with additional filtering criteria, and the AQRIG system responds with a list of particular housing matches with further details, citing MLS (Multiple Listing Service) system data as the source. The user next asks for more details about home inspections, and the AQRIG system responds using information from a FAQ document about home inspections, citing that FAQ document and its URL as a source for the response.

FIG. 2E continues the examples of FIGS. 2A-2D, and in particular continues the interaction session with the same user, with the last AQRIG system response shown at the top followed by an additional user query shown related to alternatives to 30-year fixed mortgages, and the AQRIG system responds with information from one of the group of documents that in this example is a blog post about types of mortgages and choosing between them, citing that blog post document as a source for the response information. The interaction session may continue in a similar manner with additional queries and responses.

For illustrative purposes, some embodiments are described herein in which specific types of information are acquired, used and/or presented in specific ways using specific types of data structures and by using specific types of devices-however, it will be understood that the described techniques may be used in other manners in other embodiments, and that the invention is not limited to exemplary details provided. As one non-exclusive example, specific types of data structures (e.g., trained models of one or more types) are generated and used in specific manners in some embodiments, but it will be appreciated that other types of information may be generated and used in other embodiments, including for types of information other than housing-related information. Similarly, while particular user interface display and interaction techniques are shown, other user interaction techniques may be used in other embodiments. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify the same or similar elements or acts.

As noted above, in at least some embodiments, the described techniques include providing and using a query filter that is trained to reject user queries satisfying one or more reject criteria, such as a fair housing rule filter that rejects user queries associated with fair housing rule violations. FIG. 1B illustrates one example of such a fair housing rule filter component, which in the context of the examples of FIGS. 1A-1C is an integrated part of the overall AQRIG system that uses an LLM-based response generator, but in other embodiments and situations the fair housing rule filter component (or other such query filter component) may be a standalone system that supports multiple other systems (e.g., by providing an API that receives queries and provides responses in a manner similar to that illustrated in FIG. 1B, optionally without LLM-based modification step 189), and that optionally supports other types of queries from other systems, such as requests for statistics or other information about past queries and responses, information about training data used for a classifier component, etc.; by being embodied in a software component that is added to each such other system to work within that system; etc.). In some embodiments and situations, such a query filter component includes and uses a list of non-compliant deny phrases as a reject criterion guardrail, such as a list of stop phrases that is expanded using stemming and lemmatization to detect usage of those phrases in the user input, including in at least some embodiments and situations to provide a predefined reject response if this guardrail is triggered. In some embodiments and situations, such a query filter component includes and uses another reject criterion guardrail that is a BERT-based or other transformer language model compliance classifier that is trained using a positive set of queries (e.g., using actual received plugin queries, SEO queries, natural language search queries, NLS (National Language Support) queries, and real estate acronyms to create a positive set) and a negative set of queries (e.g., using GPT-4 or another LLM with detailed instructions about fair housing to generate a large quantity, such as ~10K, noncompliant queries using the structure of the positive queries but with LLM-based induced semantic augmentations for noncompliance, such as by using the deny list and legally protected classes for the noncompliance augmentations, and optionally using few-shot prompting) and optionally a positive augmentation dataset for the positive set of queries (e.g., using similar techniques with GPT-4 or another LLM for creating tricky but compliant queries for defined classes including disability, familial status, veteran status, receipt of public assistance, etc.). In some embodiments and situations in which the query filter component is used before the query is provided to an LLM, the query filter component further includes and uses another reject criterion guardrail by adding instructions to the LLM prompt to refuse to provide information of specified types (e.g., "you should politely refuse to provide information for inputs that include references to protected classes like race, religion, sex, color, disability, national origin, familial status, gender identity, and sexual orientation due to fair housing regulations"). Such guardrails may further be applied not only to user input but also to chatbot-generated action input (e.g., for use as part of ReACT processing). In other embodiments and situations, one or more such query filter components may use other reject criteria guardrails of the same or different types, whether in addition to or instead of the illustrated reject criteria guardrails.

As noted above, in at least some embodiments, the described techniques include using a defined list of enumerated housing-related topics to categorize user queries and restrict corresponding response information. Non-exclusive examples of such housing-related topics include the following: home buying, home selling, renting, buying vs renting, landlord, home values, real estate forecasts, real estate market information and insights, tenant information, property taxes and other costs, mortgage, real estate loan types, mortgage rates/interest rates, home loans, greetings and capabilities of the chatbot, etc. As discussed in greater detail elsewhere herein, such housing-related topics may be used in various manners to restrict response information generated by the AQRIG chatbot.

As noted above, in at least some embodiments, the described techniques include using a defined group of authoritative source documents from which to provide housing-related information used in responses (e.g., a group of Web pages associated with a Web site having information about the enumerated housing-related topics), including to generate encoded representations of the document contents for use in matching to encoded representations of contents of user queries. In some embodiments and situations, the encoded representations are each a vector-based embedding (also referred to herein as a "vector embedding"), such as to summarize the semantic meaning of the document contents. Such a vector embedding may be generated in various manners in various embodiments, such as via the use of representation learning and one or more trained machine learning models, and in at least some such embodiments may be encoded in a format that is not easily discernible to a human reader. Non-exclusive examples of techniques for generating such vector embeddings are included in the following documents, which are incorporated herein by reference in their entirety: "Symmetric Graph Convolution Autoencoder For Unsupervised Graph Representation Learning" by Jiwoong Park et al., 2019 International Conference On Computer Vision, Aug. 7, 2019; "Inductive Representation Learning On Large Graphs" by William L Hamilton et al., $31^{st}$ Conference On Neural Information Processing Systems 2017 Jun. 7, 2017; and "Variational Graph Auto-Encoders" by Thomas N. Kipf et al., 30th Conference On Neural Information Processing Systems 2017 (Bayesian Deep Learning Workshop), Nov. 21, 2016. Furthermore, the generated vector embeddings may in some embodiments be further analyzed to group similar vector embeddings in a manner to facilitate later retrieval and use, such as by generating a hash number (or other hash representation) for each vector embedding (e.g., with similar vector embeddings having similar hash numbers), and grouping the same or similar hash numbers into buckets or other groups that are associated with the hash numbers of the vector embeddings in that bucket or other group (e.g., with a single hash number, a range of hash numbers, etc.), so that a particular vector embedding's hash number can serve as an index to select the bucket or other group that includes that vector embedding (and other similar vector embeddings). Additional details are included herein related to encoding and using information in various manners, to enable subsequent use of that encoded information. The generated enhanced query prompt for the LLM may include providing instructions to only respond to queries from the enumerated topics.

As noted above, in at least some embodiments, the described techniques include using a defined group of authoritative source tools to each provide current housing-related information of a particular type used in responses (e.g., information about current housing statistics and/or individual available houses, information about current mortgage rates and/or other housing affordability factors, etc.); using associations of prior queries to particular authoritative source documents used in generating their responses. Non-exclusive examples of such tools include the following: document search tool, to perform the vector embedding comparison of user query to documents, optionally with prefiltering by URLs if applicable (e.g., using metadata about document URL and chunked contents of documents, such as related to document headings/sections); current interest rates tool, such as for national level mortgage rates that are cached every hour; affordability calculator tool to provide a maximum house price budget using several parameters (e.g., down payment and income), that are requested from the user by the AQRIG system and/or previously identified from user interactions or other information about the user; mortgage calculator tool to give monthly payments, amortizations, etc. given a home price budget; FAQ page tool associated with specific housing topics; regional housing statistical information tool, such as to provide information for particular cities or neighborhoods or other regions about aspects such as quantity of houses for sale, quantity of houses for sale that are newly pending, mean number of days to pending, median list price, median sales price, percentage of listings with price cuts, etc.; greetings tool, to provide intrinsic knowledge about the AQRIG system, such as for general greeting and capability questions; etc. Multiple tools can be used in sequence for a single query, such as part of ReACT processing.

As noted above, in at least some embodiments, the described techniques include using examples of query-response pairs for LLM prompt generation (e.g., ReACT, or Reasoning and ACTing, query-response pair examples that each include one or more series of a reasoning activity, followed by an acting activity that is based on the results of the reasoning activity, followed by an observation activity that is based on the results of the acting activity). The ReACT LLM prompting may use LLM reasoning to break a user query into solvable sub problems using the defined tools discussed above, with the ReACT processing solving problems in steps by deciding a next action to take, based on the current observation from the tool. The generated enhanced query prompt for the LLM may include providing instructions for performing the ReACT processing, including via the provided example query-response pairs (e.g., 3 selected query-response pairs that are associated with a determined topic for the user query or that are otherwise matched to the user query, such as based on similarity between the user query and the query portion of the selected query-response pairs, or based on such similarity a combination of the user query and chatbot history for the current interaction session). The generated enhanced query prompt for the LLM may further include additional information, such as the following: formatting instructions about how to format response data (e.g., using bullet points, sections, list items, etc.); citation instructions related to citing the source of the information used in generating the response every time information from a document or tool is used (e.g., for the mortgage calculator tool, using a list of Json with the following structure '{"source": "https://<web-site>/mortgage-calculator", "content": " . . . "}'); etc.

As noted above, in at least some embodiments the described techniques further include using associations of prior queries to particular authoritative source documents used in generating their responses, such as to, when responding to a new user query that matches one or more of the prior queries, use the associated source document(s) for the matching prior query (ies) as part of responding to the current user query. In at least some embodiments and situations, the use of the prior queries includes building a query-to-query similarity model (e.g., using Sentence-BERT, or SBERT) and storing the prior queries and prior query-to-document associations. When identifying one or more prior queries that match a current query, in some embodiments and situations, all prior queries above a similarity threshold (e.g., 0.5) may be selected, and a union of the associated documents for the selected prior queries.

As noted above, in at least some embodiments the described techniques further include using a trained large language model (LLM) that maintains context over an interaction session with a user having multiple user queries and corresponding responses, and to ensure accurate response information by restricting the generation of the response information in particular ways (e.g., based on construction of the LLM query prompts) and by identifying and providing citations to authoritative sources used to generate the response information. In some embodiments and situations, the LLM is trained on general language sources that are not specific to housing-related content, while in other embodiments and situations the LLM may be trained based at least in part using housing-related content.

The described techniques provide various benefits in various embodiments, including to significantly improve the identification and use of responsive information to specified queries for housing-related information, including queries specified in a natural language format. Such automated techniques allow such responsive answer information to be generated much more quickly and efficiently than previously existing techniques (e.g., using less storage and/or memory and/or computing cycles) and with greater accuracy, based at least in part on using the described techniques for restricting responses to particular housing-related topics and providing citations as to sources of the information in the responses, such as using a defined list of housing-related topics, a defined group of documents with contents related to those topics, a defined group of tools that provide information related to those topics, etc. In addition, in some embodiments the described techniques may be used to provide an improved GUI in which a user may more accurately and quickly obtain information, including in response to an explicit request (e.g., in the form of a natural language query), as part of providing personalized information to the user, etc. Various other benefits are also provided by the described techniques, some of which are further described elsewhere herein.

In addition, while various of the discussion herein refers to content extracted from "documents", it will be appreciated that the described techniques may be used with a wide variety of types of content items and that references herein to a "document" apply generally to any such type of content item unless indicated otherwise (explicitly or based on the context), including, for example, textual documents (e.g., Web pages, word processing documents, slide shows and other presentations, emails and other electronic messages, etc.), visual data (e.g., images, video files, etc.), audio data (e.g., audio files), software code, firmware and other logic, genetic codes that each accompany one or more sequences of genetic information, other biological data, etc. Furthermore, the content items may be of one or more file types or other data structures (e.g., streaming data), including document fragments or other pieces or portions of a larger document or other content item, and the contents of such content items may include text and/or a variety of other types of data (e.g., binary encodings of audio information; binary encodings of video information; binary encodings of image information; mathematical equations and mathematical data structures, other types of alphanumeric data structures and/or symbolic data structures; encrypted data, etc.). In some embodiments, each of the documents has contents that are at least partially textual information, while in other embodiments at least some documents or other content items may include other types of content (e.g., images, video information, audio information, etc.).

FIG. 3 is a block diagram illustrating an embodiment of one or more server computing systems 300 executing an implementation of an AQRIG system 140, such as in a manner similar to that of FIGS. 1A-1C and with additional hardware details illustrated—the server computing system(s) and AQRIG system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.).

The server computing system(s) 300 and executing AQRIG system 140 may communicate with other computing systems and devices via one or more networks 100 (e.g., the Internet, one or more cellular telephone networks, etc.), such as user client computing devices 160 (e.g., used to supply queries; receive responsive answers; and use the received answer information, such as to display or otherwise present answer information to users of the client computing devices and/or to implement further automated activities, such as to access other functionality provided by the AQRIG system), optionally other external devices 380 (e.g., used to store and provide housing-related information of one or more types), and optionally other computing systems 390.

In the illustrated embodiment, an embodiment of the AQRIG system 140 executes in memory 330 in order to perform at least some of the described techniques, such as by using the processor(s) 305 to execute software instructions of the system 140 in a manner that configures the processor(s) 305 and computing system 300 to perform automated operations that implement those described techniques. The illustrated embodiment of the AQRIG system may include one or more components, not shown, to each perform portions of the functionality of the AQRIG system, and the memory may further optionally execute one or more other programs 335. The AQRIG system 140 may further, during its operation, store and/or retrieve various types of data on storage 320 (e.g., in one or more databases or other data structures), such as various types of user data 151, housing-related documents 321, regional housing statistics data 322a, FAQ or other summary documents specific to particular housing topics 322b, fair housing rule data 324, one or more large language models 325, one or more fair housing classifier models 326, AQRIG system data 327, fair housing training data 328, and/or various other types of optional additional information 329. The AQRIG system may further, during operation, interact with various housing information tools 385, whether executing on server computing systems 300 (e.g., as part of the other programs 335) and/or executing on one or more other external computing devices (not shown).

Some or all of the user client computing devices 160 (e.g., mobile devices), external devices 380, and other computing systems 390 may similarly include some or all of the same types of components illustrated for server computing system 300. As one non-limiting example, the computing devices 160 are each shown to include one or more hardware CPU(s) 361, I/O components 362, and memory and/or storage 369, with a browser and/or AQRIG client program 368 optionally executing in memory to interact with the AQRIG system 140 and present or otherwise use query responses 367 that are received from the AQRIG system for submitted user queries 366. While particular components are not illustrated for the other devices/systems 380 and 390, it will be appreciated that they may include similar and/or additional components.

It will also be appreciated that computing system 300 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated AQRIG system 140 may in some embodiments be distributed in various components, some of the described functionality of the AQRIG system 140 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the AQRIG system 140 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4A:
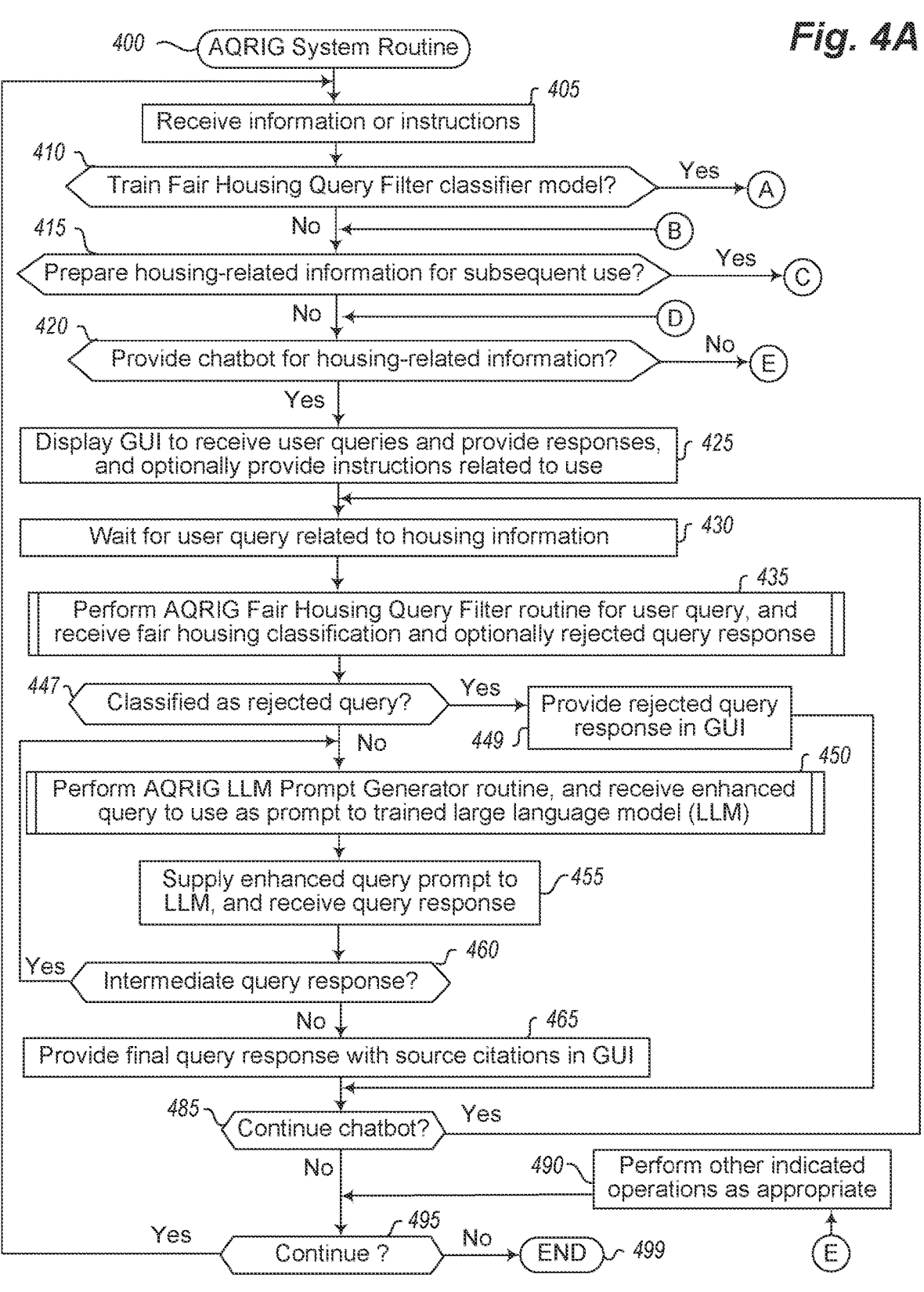

FIGS. 4A-4B are a flow diagram of an example embodiment of an AQRIG system routine 400. The routine may be provided by, for example, execution of the AQRIG system 140 of FIGS. 1A-1C, and/or the AQRIG system 140 of FIG. 3, and/or corresponding functionality discussed with respect to FIGS. 2A-2E and elsewhere herein, such as to perform automated operations related to automatically generating and providing housing-related information (e.g., to automatically respond to free-form natural language query requests for housing-related information of various types by using a chatbot with multiple automated tools to generate and provide responsive housing-related information). In the illustrated embodiment, the routine interacts with a single user at a time to provide housing-related response information to user queries from that user, but it will be appreciated that the routine may interact in a similar manner with multiple users (e.g., sequentially or concurrently), and that the routine may in other embodiments perform similar types of activities for other types of information.

In the illustrated embodiment, the routine 400 begins at block 405, where instructions or other information is received. The routine continues to block 410, where it determines if the instructions or other information received in block 405 are to train a Fair Housing Query Filter classifier model, and if so continues to block 412, where it obtains fair housing rule information, negative query examples that correspond to fair housing rules violations, and positive query examples that do not correspond to fair housing rules violations (e.g., including situations in which a legally protected class is mentioned but in a way that does not violate fair housing rules, such as "provide me with information about senior communities that restrict residents to over age 55"). After block 412, the routine continues to block 414 to train a classifier model (a bidirectional encoder representations-from-transformers language model or other transformer model) for the Fair Housing Query Filter component to classify queries as rejected or accepted.

After block 414, or if it is instead determined in block 410 that the instructions or other information received in block 405 are not to train the classifier model, the routine continues to block 415, where it determines if the instructions or other information received in block 405 are to prepare housing-related information for subsequent use, and if so continues to block 905, where it obtains a defined list of multiple housing topics. In block 910, the routine then obtains a group of documents with housing-related information for those housing topics, such as webpages each having an associated URL with housing-related contents (e.g., from a single website). In block 915, the routine then analyzes the contents of each document to generate an encoded representation of those contents, such as a vector embedding representation, and to optionally associate the encoded representation with one of the housing topics. In block 920, the routine then obtains information about prior housing-related queries and documents from the group that were used in their responses, and generates mappings of prior queries to corresponding associated documents. In block 925, the routine then determines query-response examples to use as later prompts to the LLM, such as to each have a reasoning example, a resulting action example based on that reasoning, and a resulting observation example based on that action, and optionally associates each of the query response examples with one of the housing topics. In block 930, the routine then obtains information about defined tools that each provide a type of housing-related information, and optionally associates each of the tools with one of the housing topics. In block 935, the routine then optionally obtains information about one or more additional FAQ documents or other summary documents with information about a type of housing-related functionality and information, and optionally associates each with one of the housing topics. In block 940, the routine then obtains statistical information about sales-related and offer-related information for buildings in one or more geographical regions, and in block 950 proceeds to store the obtained, determined and generated information from blocks 905 through 940 for subsequent use with the AQRIG system chatbot.

After block 950, or if it is instead determined in block 415 that the instructions or other information received in block 905 are not to prepare housing-related information for subsequent use, the routine continues to block 420 to determine if the instructions or other information received in block 405 indicate to provide a chatbot to interactively provide housing-related information, and if not continues to block 490. Otherwise the routine continues to perform blocks 425-485 to provide the chatbot functionality. In particular, in block 425, the routine displays a GUI to receive user queries and provide corresponding responses as well as to optionally display an introductory greeting and instructions related to use—in some example embodiments, the GUI is provided as part of one or more webpages or smart phone apps, such that the presentation of the information occurs on one or more client devices that receive the transmitted information from one or more server devices. After block 425, the routine continues to block 430 to wait for a user query related to housing information. After such a query is received, the routine continues to block 435, where it performs an AQRIG Fair Housing Query Filter routine to receive a classification of whether to accept or reject the user query, as well as optionally receiving a reject query response if the user query is classified as being rejected-one example of such a routine is described further with respect to FIG. 5. As discussed in greater detail elsewhere herein, the AQRIG Fair Housing Query Filter routine may further provide a modified version of the user query in its response, such as to add instructions to be included in the prompt to the LLM related to not providing information about legally protected classes, and/or to change a user query that would otherwise be rejected to remove one or more terms or otherwise modify the user query to be acceptable for further processing. In block 447, the routine then determines whether the user query was classified as being rejected, and if so continues to block 449 to provide the reject query response in the GUI. Otherwise, the routine continues to block 450, where it performs an AQRIG LLM Prompt Generator routine to generate and provide an enhanced query prompt to provide to the LLM based on the user query-one example of such a routine is described further with respect to FIG. 6. In block 455, the routine supplies the enhanced query prompt to the LLM, and receives a query response. The routine then determines in block 460 if the query response is an intermediate response, and if so returns to block 450 to continue the process of revising the prompt to determine additional information to be used in the final query response, and otherwise continues to block 465 to provide in the GUI the final query response generated by the LLM along with source citations. In block 485, the routine determines whether to continue operations of the chatbot with a current interaction session for the user, such as until an explicit indication to terminate is received, and if so returns to block 430 to wait for a next user query.

In block 490, the routine proceeds to perform one or more other indicated operations as appropriate, with non-exclusive examples of such other operations including retrieving and providing previously determined or generated information (e.g., previous user queries, previously determined responses to user queries, previously summarized and encoded content for a group of documents, etc.), receiving and storing information for later use (e.g., information about housing-related documents 321, other housing data 322, AQRIG system data 327, etc.), providing information about how one or more previous query responses were determined, performing housekeeping operations, etc.

After blocks 485 or 490, the routine continues to block 495 to determine whether to continue, such as until an explicit indication to terminate is received (or alternatively only if an explicit indication to continue is received). If it is determined to continue, the routine returns to block 405 to await further information or instructions, and if not continues to block 499 and ends.

Figure 5:
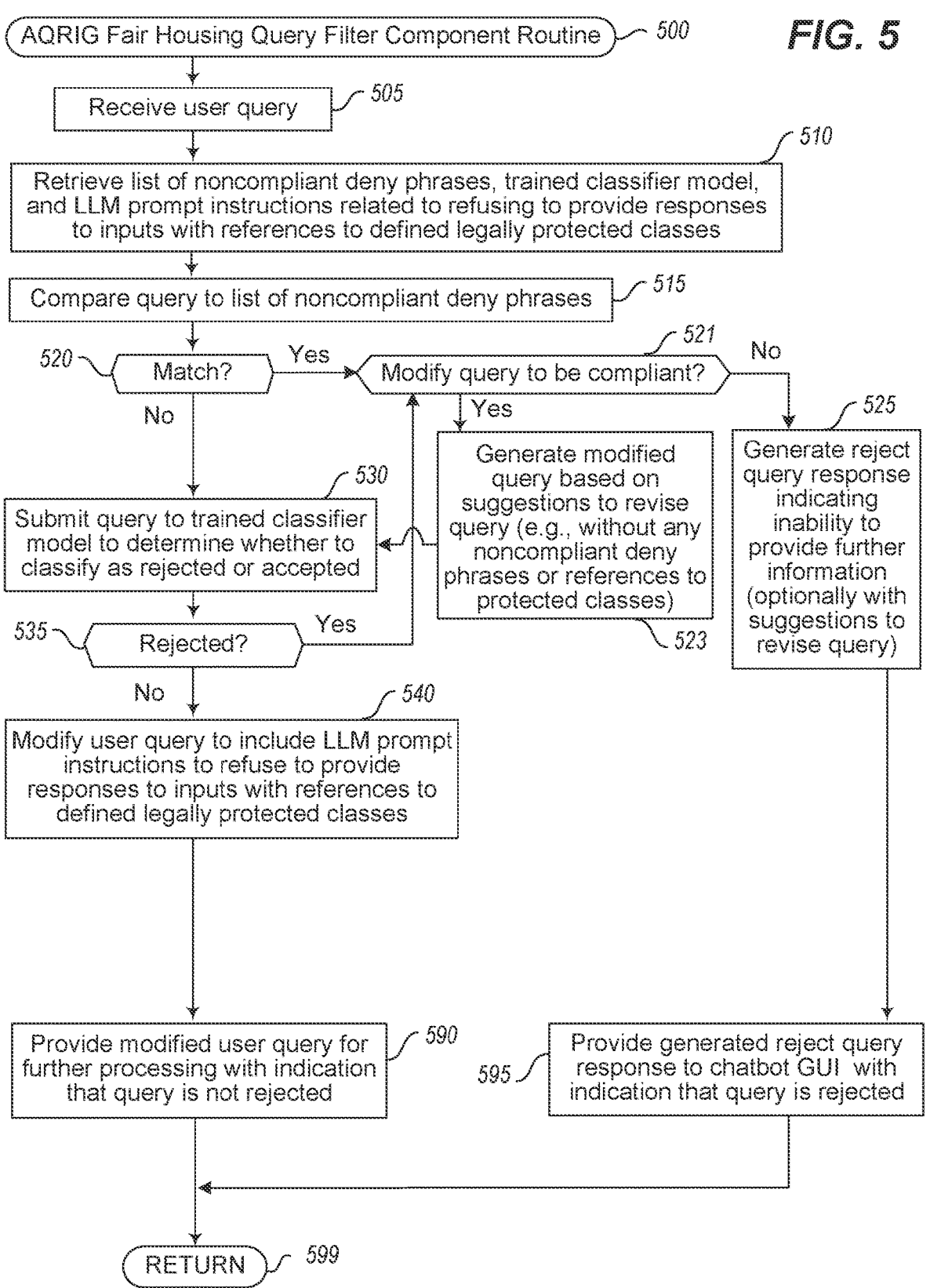
FIG. 5 illustrates a flow diagram of an example embodiment of an AQRIG Fair Housing Query Filter component routine.

FIG. 5 is a flow diagram of an example embodiment of an AQRIG Fair Housing Query Filter routine 500. The routine may be provided by, for example, execution of the AQRIG Fair Housing Query Filter component 144 of FIGS. 1A-1C and/or a corresponding component (not shown) of the AQRIG system 140 of FIG. 3 and/or with respect to corresponding functionality discussed with respect to FIGS. 2A-2E and elsewhere herein, such as to generate a classification of whether to accept or reject a user query, as well as provide a reject query response if the user query is classified as being rejected. In addition, in at least some situations, the routine 500 may be performed based on execution of block 435 of FIGS. 4A-4B, with resulting information provided and execution control returning to that location when the routine 500 ends—in other embodiments, the routine may be separate from and invoked by multiple systems and/or be incorporated in each of one or more other systems separate from the AQRIG system. In this example, the routine 500 is performed using particular types of reject criteria (e.g., using a deny list of phrases, a trained classifier model, LLM prompt generation instructions related to fair housing rules, etc.), but in other embodiments may use other types of reject criteria, whether in addition to or instead of the illustrated types of reject criteria.

The illustrated embodiment of the routine 500 begins at block 505, where a user query is received. In block 510, the routine then retrieves a list of noncompliant deny phrases, a trained classifier model and predefined LLM prompt instructions related to refusing to provide responses to inputs with references to defined legally protected classes, and in block 515 compares the user query to the list of noncompliant deny phrases. If it is determined in block 520 that there is a match between the user query and one or more of the noncompliant deny phrases, the routine continues to block 521 to determine whether to attempt to modify the user query so that it is compliant with fair housing regulations, and if so continues to block 521 to generate a modified query using improvement suggestions that include removing any noncompliant deny phrases or references to protected classes. Otherwise, the routine continues to block 525 to generate a reject query response indicating an inability to provide further information, optionally with suggestions to revise the query (e.g., indications of why the query was rejected)—as discussed elsewhere herein, the determining of the match may be performed in various manners, such as by using a match threshold or looking for an exact match between a term in the user query and one of the noncompliant deny phrases. After block 525, the routine continues to block 595 to provide an indication that the user query is rejected along with the generated reject query response for display in the chatbot GUI.

If it is instead determined in block 520 that there is not a match between the user query and the list of noncompliant deny phrases, or after block 523, the routine continues to block 530 to submit the query to the trained classifier model to determine whether to classify the user query as rejected or accepted. In block 535, if the classifier model determines to reject the user query, the routine continues to block 521, and otherwise continues to block 540 to modify the user query to include the predefined LLM prompt instructions to refuse to provide responses to inputs with references to defined legally protected classes. After block 540, the routine continues to block 590 to provide an indication that the user query is not rejected.

After blocks 590 or 595, the routine continues to block 599 and returns, such as to return to the flow of FIGS. 4A-4B at block 435 if invoked from there.

Figure 6:
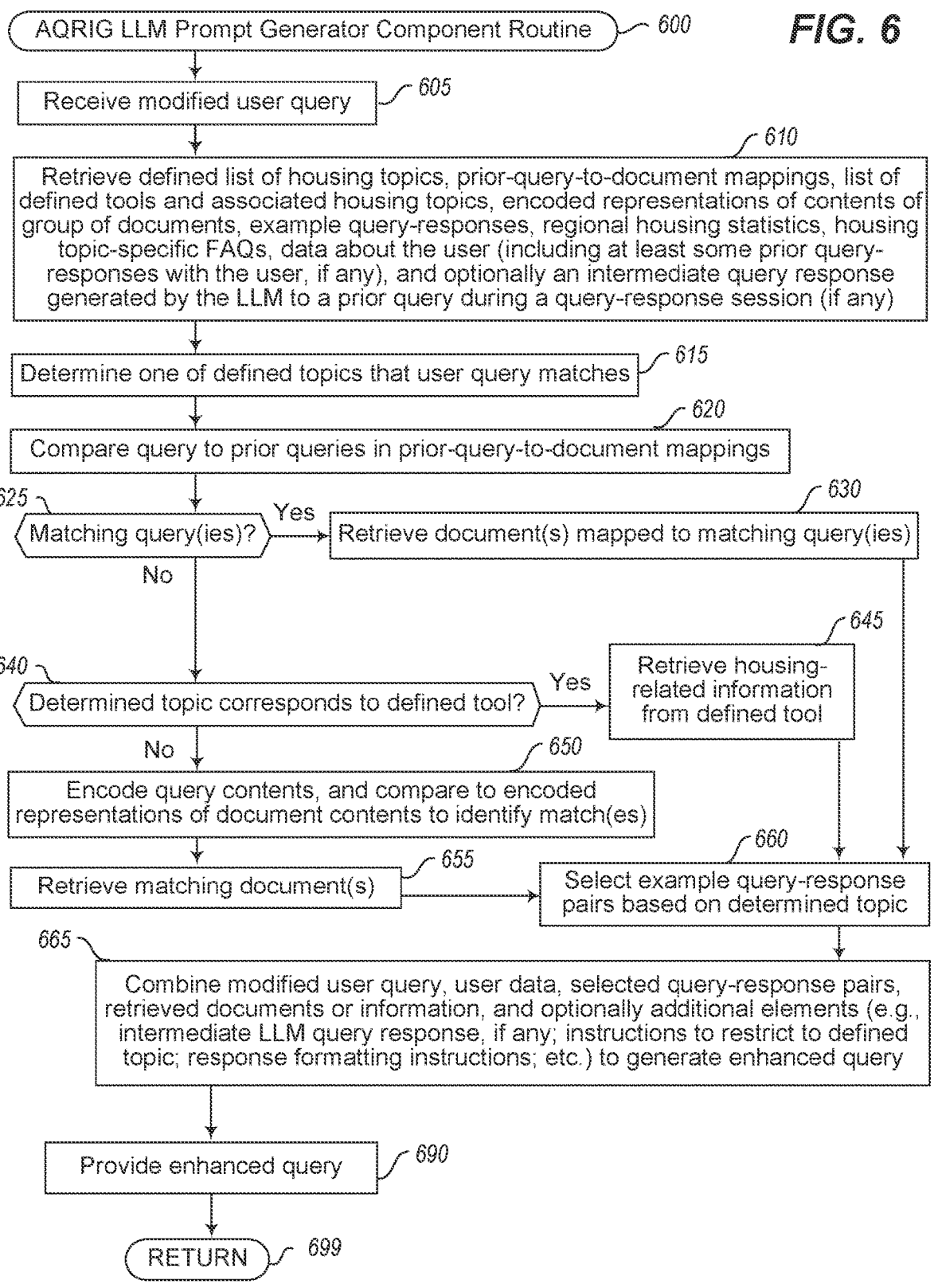
FIG. 6 illustrates a flow diagram of an example embodiment of an AQRIG LLM Prompt Generator component routine.

FIG. 6 is a flow diagram of an example embodiment of an AQRIG LLM Prompt Generator routine 600. The routine may be provided by, for example, execution of the AQRIG LLM Prompt Generator component 148 of FIGS. 1A-1C and/or of one or more corresponding components (not shown) of the AQRIG system 140 of FIG. 3 and/or with respect to corresponding functionality discussed with respect to FIGS. 2A-2E and elsewhere herein, such as to generate and provide an enhanced query prompt to provide to the LLM based on a received user query. The routine 600 may be initiated by, for example, execution of block 450 of FIGS. 4A-4B, with resulting information provided and execution control returning to that location when the routine 600 ends. In this example, the routine 600 is performed using particular types of information that is added to the enhanced query prompt in particular manners, but in other embodiments may use other types of information, whether in addition to or instead of the illustrated types of information.

The illustrated embodiment of the routine 600 begins in block 605, where the user query (as optionally modified by the AQRIG Fair Housing Query Filter component) is received. In block 610, the routine then retrieves information to be used in the generated of the enhanced query prompt, including a defined list of housing topics, mappings of prior queries to associated documents used in their responses, a list of defined tools and optionally associated housing topics, encoded representations of contents of a group of documents and optionally associated housing topics, example query-response pairs, regional housing statistics, FAQ or other summary documents with contents specific to particular housing topics, data about the user (optionally including at least some prior query-responses with the user during a current interaction session, if any), and optionally an intermediate query response generated by the LLM (if any) to a prior query during a current query-response session with multiple queries, etc. in block 615, the routine then determines one of the defined topics that the user query matches, such as a best match. In block 620, the routine then compares the user query to prior queries in the mappings of prior queries to associated documents, and in block 625 determines whether any of the prior queries are sufficiently matching. If so, the routine continues to block 630 to retrieve the documents mapped to those one or more matching queries, and otherwise continues to block 640 to determine whether the determined topic for the user query corresponds to one of the defined tools. If so, the routine continues to block 645 to retrieve housing-related information from the defined tool, and otherwise continues to block 650 to encode the user query contents and to compare that encoded representation to other encoded representations of the document contents for the group of documents to identify matches, followed by retrieving those matching documents in block 655. After blocks 630 or 645 or 655, the routine continues to block 660 to select one or more example query-response pairs (e.g., three pairs) by comparing the user query to the query portions of the example query-response pairs, while in other embodiments and situations the example query-response pairs may be selected in other manners (e.g., based on the determined topic). After block 660, the routine continues to block 665 to generate the enhanced query by combining the user query received in block 605 with user data, the selected query-response pairs, the retrieved documents or information from blocks 630 or 645 or 655, and optionally additional elements (e.g., directions to restrict responses to the defined topic, response formatting instructions, the instructions related to fair housing that are part of the modified user query, etc.). In block 690, the enhanced query is then provided, and after block 690, the routine continues to block 699 and returns.

FIG. 7 is a flow diagram of an example embodiment of a client device routine 700. The routine may be provided by, for example, operations of a client computing device 110 of FIGS. 1A-1C and/or a client computing device 160 of FIG. 3 and/or with respect to corresponding functionality discussed with respect to FIGS. 2A-2E and elsewhere herein, such as to interact with users or other entities who submit queries (or other information) to the AQRIG system, to receive responsive answers (or other information) from the AQRIG system, and to optionally use the received information in one or more manners (e.g., to automatically initiate follow-up activities in accordance with a received responsive answer, such as to initiate a house inspection based on corresponding inspection-related information that is received, to initiate a mortgage application based on corresponding financing-related information that is received, etc.).

The illustrated embodiment of the routine 700 begins at block 703, where information is optionally obtained and stored about the user, such as for later use in personalizing or otherwise customizing further actions to that user. The routine then continues to block 705 to interact with the AQRIG system to initiate a chatbot interaction session (e.g., in response to a corresponding instruction from the user), as well as to optionally receive a greeting and/or introductory instructions regarding using the chatbot. In block 707, the routine then displays a GUI for the interaction session, and optionally displays the received greeting and/or introductory instructions, if any. The routine then continues to perform blocks 710-780 as part of participating in the interaction session with the chatbot.

In particular, the routine continues to block 710 after block 707, where information or a request is received from the user. In block 715, the routine determines if the information or request received in block 710 is a query to submit to the chatbot, such as in a natural language format (e.g., freeform text), and if not continues to block 785. Otherwise, the routine continues to block 720, where it sends the received query to the AQRIG system interface, optionally along with additional information about the user from block 703, to obtain a corresponding responsive answer—in other embodiments, the routine may further modify the received user query to personalize and/or customize the information to be provided to the AQRIG system (e.g., to add information specific to the user, such as location, demographic information, preference information, etc.). In block 730, the routine then receives a responsive answer to the query from the AQRIG system. In block 780, the routine then displays the received query response in the GUI, and optionally initiates further use of the query response in one or more manners (e.g., in a manner that is personalized and/or customized for the user)—in some embodiments, the further initiated activities may include invoking of other functionality of the AQRIG system separate from the chatbot, such as to initiate an inspection process for a house based on inspection-related response information received from the chatbot, to initiate a mortgage application process based on financing-related response information received from the chatbot, to initiate matching the user with a real estate professional as part of a housing search based on corresponding response information received from the chatbot, etc.

In block 785, the routine instead performs one or more other indicated operations as appropriate, with non-exclusive examples including sending information to the AQRIG system of other types, receiving and storing user data for later use in personalization and/or customization activities, receiving and responding to requests for information about previous user queries and/or corresponding responsive answers for a current user and/or client device, receiving and responding to indications of one or more housekeeping activities to perform, etc. After blocks 780 or 785, the routine continues to block 795 to determine whether to continue, such as until an explicit indication to terminate is received (or alternatively only if an explicit indication to continue is received). If it is determined to continue, the routine returns to block 705, and if not continues to block 799 and ends.

It will be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, synchronously or asynchronously, etc.) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the claims that are specified and the elements recited therein. In addition, while certain aspects of the invention may be presented at times in certain claim forms, the inventors contemplate the various aspects of the invention in any available claim form. For example, while only some aspects of the invention may be recited at a particular time as being embodied in a computer-readable medium, other aspects may likewise be so embodied.

What is claimed is:

1. A computer-implemented method comprising:

analyzing, by one or more computing devices, contents of multiple documents with information related to multiple housing topics, including generating an encoded vector representation for each of the multiple documents of information related to housing in the contents of that document;

generating, by the one or more computing devices while performing automated operations without human control, and for multiple initial queries from a plurality of users related to one or more housing topics, multiple associated initial responses that are each generated by a trained large language model to a respective one of the multiple initial queries and that are each associated with one or more documents of the multiple documents that are used in proving that initial response;

generating, by the one or more computing devices performing the automated operations without human control, feedback to use with the trained large language model based on the multiple associated initial responses, including determining a mapping between each of the initial queries and one or more associated documents of the multiple documents that were used in providing the associated initial response to that initial query;

obtaining, by the one or more computing devices, information about multiple defined tools each configured to provide information about at least one housing topic; and providing, by the one or more computing devices performing the automated operations without human control, after receiving a first query that is about at least one first housing topic and is from a first user and receiving a second query about that is about at least one second housing topic and is from the first user, housing-related responses to the first and second queries that are based on the multiple documents and the multiple tools and the trained large language model and the generated feedback, including:

determining, by the one or more computing devices and after receiving the first query, a first response to the first query by using the multiple initial queries, including:

identifying, by the one or more computing devices, one or more initial queries of the multiple initial queries that have a degree of similarity to the first query that is above a first defined threshold using a first defined similarity metric;

generating, by the one or more computing devices, a first prompt to supply to the trained large language model that is based in part on the generated feedback, wherein the first prompt includes the first query and further includes information about the contents of the one or more associated documents mapped to each of the one or more initial queries and further includes one or more predetermined query-response examples; and generating, by the one or more computing devices, the first response based at least in part on output of the trained large language model to the generated first prompt;

presenting, by the one or more computing devices, the determined first response to the first query, including indicating the one or more mapped documents for each of the one or more initial queries as a source of the determined first response;

determining, by the one or more computing devices and after receiving the second query, a second response to the second query using the trained large language model, including:

determining, by the one or more computing devices, that none of the multiple initial queries has a degree of similarity to the second query above the first defined threshold using the first defined similarity metric, and identifying at least one of the multiple documents whose encoded vector representation differs from an encoded version of the second query by at most a defined threshold distance using a second defined similarity metric;

selecting, by the one or more computing devices, one of the multiple defined tools associated with the second query;

generating, by the one or more computing devices and in response to the second query, additional information from the selected one defined tool;

generating, by the one or more computing devices, a second prompt to supply to the trained large language model that is based in part on the generated feedback, wherein the second prompt includes the second query and the identified at least one document and the additional information and further includes information about the first user and further includes the one or more predetermined query-response examples, the information about the first user including information from prior tracked interactions of the first user with housing-related documents and further including at least the first query and first response; and generating, by the one or more computing devices, the second response based at least in part on output of the trained large language model to the generated second prompt; and presenting, by the one or more computing devices, the determined second response to the second query, including indicating the selected one tool as a source of the determined second response.

2. The computer-implemented method of claim 1 wherein the determining of the second response to the second query includes identifying one of the multiple housing topics associated with the second query, and restricting the second response to the identified one housing topic, including performing the selecting of the one defined tool based on the identified one housing topic.

3. The computer-implemented method of claim 1 wherein the one or more predetermined query-response examples include multiple predetermined query-response examples that each includes one or more reasoning-action-observation examples, each reasoning-action-observation example including a reasoning example and an action example based on that reasoning example and an observation example based on that action example.

4. The computer-implemented method of claim 1 wherein the first and second queries are part of a sequence of multiple queries from the first user, wherein the providing of the housing-related responses includes providing a graphical user interface (GUI) of a chatbot that receives the sequence of multiple queries, wherein the information about the first user in the second prompt includes adding information about prior interactions of the user with information about multiple buildings, and wherein the presenting of the determined first and second responses includes displaying the determined first and second responses in the GUI.

5. The computer-implemented method of claim 1 wherein the determining of the second response includes identifying one of multiple enumerated housing topics associated with the second query, and restricting the response to the identified one housing topic, including restricting the identifying of the at least one document to documents having contents related to the identified one housing topic.

6. The computer-implemented method of claim 1 further comprising determining, by the one or more computing devices, a third housing-related response to a third query about at least one third housing topic, including:

identifying, by the one or more computing devices, one of multiple enumerated housing topics associated with the third query;

selecting, by the one or more computing devices and based on the identified one housing topic, one of the multiple defined tools, wherein the multiple defined tools are each configured to provide information about at least one housing topic;

generating, by the one or more computing devices, the third housing-related response using a third prompt that is provided to the trained large language model and that includes the third prompt and information generated by the selected one tool; and presenting, by the one or more computing devices, the determined third housing-related response to the third query including an indication of the selected one tool as a source for the determined third housing-related response.

7. The computer-implemented method of claim 1 wherein the one or more predetermined query-response examples include multiple predetermined query-response examples that each includes one or more reasoning-action-observation examples, each reasoning-action-observation example including a reasoning example and an action example based on that reasoning example and an observation example based on that action example.

8. A non-transitory computer-readable medium having stored contents that cause one or more computing devices to perform automated operations without human input, the automated operations including at least:

analyzing, by the one or more computing devices, contents of multiple documents with information related to multiple housing topics, including generating an encoded vector representation for each of the multiple documents of information related to housing in the contents of that document;

generating, by the one or more computing devices during the performing of the automated operations without human input, and for multiple initial queries from a plurality of users related to at least one housing-related topic, multiple associated initial responses that are each generated by a trained large language model to a respective one of the multiple initial queries and that are each associated with one or more documents of the multiple documents that are used in proving that initial response;

generating, by the one or more computing devices during the performing of the automated operations without human input, feedback to use with the trained large language model based on the multiple associated initial responses, including determining, for each of the multiple initial queries, a mapping between that initial query and the one or more documents of the multiple documents that were used in providing the associated initial response to that initial query;

obtaining, by the one or more computing devices, information about multiple defined tools each configured to provide information about at least one housing topic; and providing, by the one or more computing devices performing the automated operations without human control, after receiving a first query that is about at least one first housing topic and is from a first user and receiving a second query about that is about at least one second housing topic and is from the first user, housing-related responses to the first and second queries that are based on the multiple documents and the multiple tools and the trained large language model and the generated feedback, including:

determining, by the one or more computing devices and after receiving the first query, a first response to the first query by using the multiple initial queries including:

identifying by the one or more computing devices, one or more initial queries of the multiple initial queries that have a degree of similarity to the first query that is above a first defined threshold using a first defined similarity metric;

generating, by the one or more computing devices, a first prompt to supply to the trained large language model that is based in part on the generated feedback, wherein the first prompt includes the first query and further includes information about the contents of the one or more associated documents mapped to each of the one or more initial queries and further includes one or more predetermined query-response examples, and generating, by the one or more computing devices, the first response based at least in part on output of the trained large language model to the generated first prompt:

presenting, by the one or more computing devices, the determined first response to the first query, including indicating the one or more mapped documents for each of the one or more initial queries as a source of the determined first response;

determining, by the one or more computing devices and after receiving the second query, a second response to the second query using the trained large language model, including:

determining, by the one or more computing devices, that none of the multiple initial queries has a degree of similarity to the second query above the first defined threshold using the first defined similarity metric, and identifying at least one of the multiple documents whose encoded vector representation differs from an encoded version of the second query by at most a defined threshold distance using a second defined similarity metric;

selecting, by the one or more computing devices, one of the multiple defined tools associated with the second query;

generating, by the one or more computing devices and in response to the second query, additional information from the selected one defined tool:

generating, by the one or more computing devices, a second prompt to supply to the trained large language model that is based in part on the generated feedback, wherein the second prompt includes the second query and the identified at least one document and the additional information and further includes information about the first user and further includes the one or more predetermined query-response examples, the information about the first user including information from prior tracked interactions of the first user with housing-related documents and further including at least the first query and first response; and generating, by the one or more computing devices, the second response based at least in part on output of the trained large language model to the generated second prompt; and presenting, by the one or more computing devices, the determined second response to the second query, including indicating the selected one tool as a source of the determined second response.

9. The non-transitory computer-readable medium of claim 8 wherein the first and second queries are part of a sequence of multiple queries from the first user, wherein the stored contents include software instructions that, when executed, cause the one or more computing devices to perform further automated operations without human input including providing, by the one or more computing devices, a chatbot with a graphical user interface (GUI) that receives the sequence of multiple queries, and wherein the presenting of the determined first and second responses includes displaying the determined first and second responses in the GUI.

10. The non-transitory computer-readable medium of claim 9 wherein the information about the first user in the second prompt information from prior interactions of the first user with information about multiple buildings.

11. The non-transitory computer-readable medium of claim 8 wherein the generating of the response to the second query includes identifying one of multiple enumerated housing topics associated with the second query, and restricting the second response to the identified one housing topic, including performing the identifying of the at least one documents to include documents having contents related to the identified one housing topic.

12. The non-transitory computer-readable medium of claim 8 wherein the automated operations further include, for the first query:

identifying, by the one or more computing devices, one of multiple enumerated housing topics associated with the first query; and selecting, by the one or more computing devices and based on the identified one housing topic, ene a first tool of the multiple defined tools wherein the multiple defined tools are each configured to provide information about at least one housing topic;

and wherein the determining of the first response to the first query includes adding information to the first prompt generated by the selected first tool, and wherein the presenting of the determined first response further includes indicating the selected first tool as a source.

13. The non-transitory computer-readable medium of claim 12 wherein the second query is for a housing-related topic about financing to acquire a building, and wherein the selected one tool of the multiple defined tools includes at least one of a first tool to provide current mortgage rates or a second tool to determine an affordable mortgage amount for the first user.

14. The non-transitory computer-readable medium of claim 8 wherein the one or more predetermined query-response examples include multiple predetermined query-response examples that each includes one or more reasoning-action-observation examples, each reasoning-action-observation example including a reasoning example and an action example based on that reasoning example and an observation example based on that action example.

15. The non-transitory computer-readable medium of claim 8 wherein the responding to each of the first and second queries further includes selecting, from a plurality of predetermined query-response examples, the one or more predetermined query-response examples to include in the generated prompt for that query based at least in part on a housing-related topic determined for that query.

16. The non-transitory computer-readable medium of claim 8 wherein the generating of the prompt for each of the first and second queries further includes adding instructions for the trained large language model to use in formatting the output of the trained large language model.

17. The non-transitory computer-readable medium of claim 8 wherein the multiple initial queries include one or more defined queries that are each manually associated with at least one document selected from the multiple documents.

18. The non-transitory computer-readable medium of claim 8 wherein the multiple documents are Web pages on a Web site, wherein the encoded vector representations for the contents of the multiple documents are vector-based embeddings summarizing the contents, wherein the encoded version of the second query is an additional vector-based embedding, and wherein the identifying of the at least one document includes measuring a distance between the additional vector-based embedding and each of the vector-based embeddings for the multiple documents using a vector distance metric.

19. The non-transitory computer-readable medium of claim 8 wherein the generating of the encoded vector representations of the contents of the multiple documents includes, for each of the multiple documents, generating a first encoded representation of all contents of the document, and generating a second encoded representation of a selected subset of the contents of the document.

20. A system comprising:

one or more hardware processors of one or more computing devices; and one or more memories with stored instructions that, when executed by at least one of the one or more hardware processors, cause at least one computing device of the one or more computing devices to perform automated operations without human control including at least:

analyzing contents of multiple documents with information related to multiple housing topics, including generating an encoded vector representation for each of the multiple documents of the housing-related information in that document;

generating, for multiple initial queries related to one or more housing-related topics, multiple associated initial responses that are each generated by a trained large language model to a respective one of the multiple initial queries and that are each associated with one or more documents of the multiple documents that are used in proving that initial response;

generating feedback to use with the trained large language model based on the multiple associated initial responses, including determining, for each of the multiple initial queries, a mapping between that initial query and the one or more documents of the multiple documents that were used in providing the associated initial response to that initial query; and obtaining information about multiple defined tools each configured to provide information about at least one housing topic; and providing, after receiving a first query that is about at least one first housing topic and is from a first user and receiving a second query about that is about at least one second housing topic and is from the first user, housing-related responses to the first and second queries that are based on the multiple documents and the multiple tools and the trained large language model and the generated feedback, including:

determining, after receiving the first query, a first response to the first query by using the multiple initial queries, including:

identifying one or more initial queries of the multiple initial queries that have a degree of similarity to the first query that is above a first defined threshold using a first defined similarity metric;

generating a first prompt to supply to the trained large language model that is based in part on the generated feedback, wherein the first prompt includes the first query and further includes information about the contents of the one or more associated documents mapped to each of the one or more initial queries and further includes one or more predetermined query-response examples; and generating the first response based at least in part on output of the trained large language model to the generated first prompt;

presenting the determined first response to the first query, including indicating the one or more mapped documents for each of the one or more initial queries as a source of the determined first response;

determining, after receiving the second query, a second response to the second query using the trained large language model, including:

determining that none of the multiple initial queries has a degree of similarity to the second query above the first defined threshold using the first defined similarity metric, and identifying at least one of the multiple documents whose encoded vector representation differs from an encoded version of the second query by at most a defined threshold distance using a second defined similarity metric;

selecting one of the multiple defined tools associated with the second query;

generating additional information from the selected one defined tool;

generating a second prompt to supply to the trained large language model that is based in part on the generated feedback, wherein the second prompt includes the second query and the identified at least one document and the additional information and further includes information about the first user and further includes the one or more predetermined query-response examples, the information about the first user including information from prior tracked interactions of the first user with housing-related documents and further including at least the first query and first response; and generating the second response based at least in part on output of the trained large language model to the generated second prompt; and presenting the determined second response to the second query, including indicating the selected one tool as a source of the determined second response.

21. The system of claim 20 wherein the stored instructions include software instructions that, when executed, cause the one or more computing devices to perform the automated operations without human control, and wherein the presenting of the determined second response includes displaying the determined second response in a graphical user interface of a chatbot.

22. The system of claim 20 wherein the generating of the first prompt includes adding information to the first prompt about the first user from whom the first query is received, the added information including at least one of one or more prior queries by the first user, or information from prior interactions of the first user with information about multiple buildings.

23. The system of claim 20 wherein the generating of the second prompt includes identifying one of multiple enumerated housing topics that is associated with the second query, and restricting the second response to the identified one housing topic, including performing the identifying of the at least one document to restrict the at least one document to have contents related to the identified one housing topic.

24. The system of claim 20 wherein the automated operations further include:

identifying one of multiple enumerated housing topics that is associated with the first query; and selecting, based on the identified one housing topic, one or more tools of the multiple defined tools, wherein the multiple defined tools are each configured to provide information about at least one housing topic;

and wherein the generating of the first prompt includes adding information to the first prompt that is generated by the selected one or more tools, and wherein the presenting of the determined first response further includes indicating the selected one or more tools as a source of the generated first response.

25. The system of claim 24 wherein the identified one housing topic is about financing to acquire a building, and wherein the selected one or more tools include at least one of a first tool to provide current mortgage rates, or a second tool to determine an affordable mortgage amount for the first user.

* * * * *